(12) United States Patent
Ochi et al.

(10) Patent No.: US 11,466,752 B2
(45) Date of Patent: Oct. 11, 2022

(54) TRANSMISSION BELT AND CONTINUOUSLY VARIABLE TRANSMISSION, METHOD FOR DESIGNING ELEMENT, AND METHOD FOR PRODUCING ELEMENT

(71) Applicants: AISIN CORPORATION, Kariya (JP); TOYOTA JIDOSHA KABUSHIKI KAISHA, Toyota (JP)

(72) Inventors: Akira Ochi, Aichi (JP); Ryohei Urata, Aichi (JP); Wataru Ishihara, Aichi (JP); Junichi Tokunaga, Aichi (JP); Takayuki Miyake, Aichi (JP); Hideaki Takahara, Aichi (JP); Keisuke Ninomiya, Aichi (JP); Yu Inase, Shizuoka (JP); Fumiya Kaji, Shizuoka (JP); Yuji Nagasawa, Aichi (JP)

(73) Assignees: AISIN CORPORATION, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 275 days.

(21) Appl. No.: 16/762,344

(22) PCT Filed: Dec. 7, 2018

(86) PCT No.: PCT/JP2018/045014
§ 371 (c)(1),
(2) Date: May 7, 2020

(87) PCT Pub. No.: WO2019/112026
PCT Pub. Date: Jun. 13, 2019

(65) Prior Publication Data
US 2020/0300335 A1    Sep. 24, 2020

(30) Foreign Application Priority Data
Dec. 7, 2017 (JP) .............................. JP2017-235552

(51) Int. Cl.
  *F16G 5/16*    (2006.01)
  *B21D 53/14*   (2006.01)
  *F16H 9/18*    (2006.01)

(52) U.S. Cl.
  CPC ............... *F16G 5/16* (2013.01); *B21D 53/14* (2013.01); *F16H 9/18* (2013.01)

(58) Field of Classification Search
  CPC ..... F16G 5/16; F16G 5/18; F16H 9/24; F16H 9/125; F16H 2061/66295
  (Continued)

(56) References Cited

U.S. PATENT DOCUMENTS 3,016,755 A * 1/1962 Dittrich ..................... F16G 5/18
                                                474/201
3,364,767 A * 1/1968 Bredschneider .......... F16G 5/18
                                                474/245

(Continued)

FOREIGN PATENT DOCUMENTS

JP    2000-213609 A    8/2000
JP    2010-023075 A    2/2010

(Continued)

OTHER PUBLICATIONS

International Search Report for PCT/JP2018/045014 dated Mar. 12, 2019.

*Primary Examiner* — Henry Y Liu
(74) *Attorney, Agent, or Firm* — Sughrue Mion, PLLC

(57) ABSTRACT

Elements of a transmission belt wound around pulleys of a continuously variable transmission each include a body part, a pair of pillar parts, and a pair of side surfaces. The pair of side surfaces each include a first side surface formed on a corresponding one of the pillar parts; and a second side surface formed so as to continue from the first side surface, and located more on an inner circumference side than the first side surface. A pair of the first side surfaces each are (Continued)

formed so as to be inclined toward an inner side of a corresponding one of the pillar parts with respect to an extending direction, from an inner circumference side to an outer circumference side of a ring, of a corresponding one of the second side surfaces continuing from the first side surface, and a pair of the second side surfaces is formed such that the second side surfaces are spaced farther apart from each other as the second side surfaces extend from the inner circumference side to the outer circumference side, and that an angle formed between the pair of the second side surfaces is larger by 0.2 to 0.8 degrees than an opening angle of V-shaped grooves of the pulleys.

7 Claims, 17 Drawing Sheets

(58) Field of Classification Search
USPC .......................................................... 474/242
See application file for complete search history.

(56) References Cited

U.S. PATENT DOCUMENTS

| | | | | |
|---|---|---|---|---|
| 3,916,709 A * | 11/1975 | Steuer | ................. | F16H 9/24 474/201 |
| 4,545,779 A * | 10/1985 | Sakakibara | ............... | F16G 5/18 474/201 |
| 4,552,549 A * | 11/1985 | Hattori | ..................... | F16G 5/16 474/204 |
| 4,560,371 A * | 12/1985 | Hattori | ..................... | F16G 5/16 474/201 |
| 4,618,338 A * | 10/1986 | Rattunde | ................... | F16H 9/24 474/245 |
| 4,631,042 A * | 12/1986 | Rattunde | ................... | F16G 5/18 474/8 |
| 4,795,406 A * | 1/1989 | Dittrich | ..................... | F16H 9/24 474/201 |
| 4,813,920 A * | 3/1989 | Inukai | ..................... | F16G 5/166 474/240 |
| 4,900,295 A * | 2/1990 | Tani | ......................... | F16G 5/06 474/167 |
| 4,915,677 A * | 4/1990 | Simon | ..................... | F16G 5/16 474/244 |
| 5,004,450 A * | 4/1991 | Ide | .......................... | F16H 9/125 474/242 |
| 5,328,412 A * | 7/1994 | Durum | ..................... | F16H 55/56 474/8 |
| 5,792,013 A * | 8/1998 | Heinrich | .................. | F16G 5/18 474/8 |
| 6,283,882 B1 * | 9/2001 | Nonaka | ................... | F16G 5/166 474/201 |
| 6,416,433 B1 * | 7/2002 | Linnenbrugger | ....... | F16H 9/125 474/8 |
| 6,440,024 B1 * | 8/2002 | Kobayashi | .............. | F16G 5/163 474/245 |
| 6,652,403 B2 * | 11/2003 | Drees | ..................... | F16H 9/125 474/201 |
| 6,811,507 B2 * | 11/2004 | Baumann | .............. | B21L 15/005 474/215 |
| 6,926,631 B2 * | 8/2005 | Brandsma | ................. | F16G 5/16 474/8 |
| 7,037,225 B2 * | 5/2006 | Takagi | ................... | F16H 55/563 474/8 |
| 7,874,952 B2 * | 1/2011 | Tada | ......................... | F16G 5/18 474/215 |
| 7,951,032 B2 * | 5/2011 | Yagasaki | ................. | F16H 55/38 474/260 |
| 8,647,223 B2 * | 2/2014 | Kuwabara | ................. | F16G 5/16 474/242 |
| 9,279,475 B2 * | 3/2016 | Sumida | ..................... | F16H 9/18 |
| 2002/0045505 A1 * | 4/2002 | Yoshida | .................... | F16G 5/16 474/240 |
| 2002/0052261 A1 * | 5/2002 | Kanokogi | .............. | F16G 5/163 474/201 |
| 2003/0144097 A1 * | 7/2003 | Brandsma | ................. | F16G 5/16 474/69 |
| 2005/0170926 A1 * | 8/2005 | Aoyama | .................... | F16G 5/16 474/237 |
| 2005/0187057 A1 * | 8/2005 | Lou | .......................... | F16G 5/18 474/245 |
| 2005/0221938 A1 * | 10/2005 | Yoshida | ................... | F16H 55/56 474/201 |
| 2007/0072721 A1 * | 3/2007 | Takagi | ..................... | F16G 5/16 474/201 |
| 2007/0117663 A1 * | 5/2007 | Van Der Leest | ....... | F16H 55/56 474/201 |
| 2007/0232430 A1 * | 10/2007 | Yasuhara | .................. | F16G 5/18 474/215 |
| 2008/0274848 A1 * | 11/2008 | Van der Leest | .......... | F16G 5/16 474/201 |
| 2009/0082148 A1 * | 3/2009 | Van Der Leest | ....... | F16H 9/125 474/166 |
| 2009/0118042 A1 * | 5/2009 | Rothenbuhler | ........... | F16H 9/24 474/8 |
| 2009/0280940 A1 * | 11/2009 | Toyohara | .................. | F16G 5/16 474/242 |
| 2010/0004084 A1 * | 1/2010 | Fan | ............................ | F16G 5/20 474/242 |
| 2010/0227721 A1 * | 9/2010 | Kato | ........................ | F16G 5/16 474/242 |
| 2016/0319917 A1 * | 11/2016 | Van der Meer | .......... | F16G 5/16 |
| 2019/0154112 A1 * | 5/2019 | Ochi | ........................ | F16G 5/16 |

FOREIGN PATENT DOCUMENTS

| | | |
|---|---|---|
| JP | 2017-180784 A | 10/2017 |
| WO | 2005/019684 A1 | 3/2005 |
| WO | 2017/138217 A1 | 8/2017 |

\* cited by examiner

Angle θb [°] formed between a pair of second side surfaces

Angle θb [°] formed between a pair of second side surfaces

TRANSMISSION BELT AND CONTINUOUSLY VARIABLE TRANSMISSION, METHOD FOR DESIGNING ELEMENT, AND METHOD FOR PRODUCING ELEMENT

CROSS REFERENCE TO RELATED APPLICATIONS

This application is a National Stage of International Application No. PCT/JP2018/045014 filed Dec. 7, 2018 claiming priority based on Japanese Patent Application No. 2017-235552, filed Dec. 7, 2017, the entire contents of which are incorporated herein by reference.

TECHNICAL FIELD

The present specification discloses a transmission belt, a continuously variable transmission, a method for designing an element, and a method for producing an element.

BACKGROUND ART

Conventionally, as a transmission belt of this kind, there is proposed a transmission belt that includes a plurality of elements each including a main body part (body part) including a saddle surface, and column parts (pillar parts) extending from both sides in a width direction of the saddle surface in the width direction; and a ring that circularly puts together the plurality of elements by an inner circumferential surface of the ring coming into contact with each of the saddle surfaces of the plurality of elements (see, for example, Patent Literature 1). A pair of side surfaces of the body part is formed so as to be spaced farther apart from each other as they extend from an inner circumference side to an outer circumference side of the ring.

In addition, there is also proposed a transmission belt that includes a plurality of transverse elements (elements) each including a substantially inverted-trapezoidal body part, a substantially triangular head part extending from a central portion in a width direction thereof toward outer circumference sides of rings, and a pair of depressed parts that open outward in the width direction between the body part and the head part; and carriers (rings) including two sets of continuous bands and held in the pair of depressed parts (see, for example, Patent Literature 2). A pair of lateral side surfaces of each transverse element is tapered inward in a radial direction, and is formed such that an angle formed between the pair of lateral side surfaces is larger than an opening angle of V-shaped grooves of pulleys. By this, contact pressure between the lateral side surfaces of the transverse element and the pulley is prevented from decreasing outward in the radial direction, enabling to reduce local wear of the lateral side surfaces.

Patent Literature 1: JP 2017-180784 A
Patent Literature 2: JP 2003-535289 A

SUMMARY OF THE DISCLOSURE

In the transmission belt described in Patent Literature 1 that includes elements each including a body part including a saddle surface that comes into contact with a ring; and a pair of pillar parts extending from both sides in a width direction of the saddle surface in the width direction, the element is pushed out from an inner circumference side to an outer circumference side of the ring by a compression force received by a pair of side surfaces of the element from a pulley, by which a force (tension) from the ring acts on a central portion in the width direction of the saddle surface from the outer circumference side to the inner circumference side of the ring. Due to this, the element is significantly deformed by the force received by the central portion in the width direction of the saddle surface from the ring. As a result, a bias occurs in contact pressure (surface pressure) between the pair of side surfaces and the pulley, causing local wear of the pair of side surfaces.

In the transmission belt described in Patent Literature 2 that includes elements each including a body part; a substantially triangular head part; and a pair of depressed parts that open outward in a width direction between the body part and the head part, the occurrence of deformation in sheaves is taken into account upon determining an opening angle of a pair of side surfaces of the element. The element of this configuration is also likely to be deformed by a force (tension) received from rings as described above, but the deformation of the element by the force received from the rings is not considered at all.

The present disclosure reduces local wear of a pair of side surfaces of an element that come into contact with a V-shaped groove of a pulley, the element having, between the pair of side surfaces in a width direction of a body part, a saddle surface with which an inner circumferential surface of a ring comes into contact.

The present disclosure adopts the following aspects to reduce the local wear of a pair of side surfaces.

A transmission belt of the present disclosure is a transmission belt including: a plurality of elements; and a ring that circularly puts together the plurality of elements, the transmission belt being wound around V-shaped grooves of a pair of pulleys of a continuously variable transmission to transmit power, and the main points are that the elements each include a body part including a saddle surface that comes into contact with the ring; a pair of pillar parts extending from both sides in a width direction of the saddle surface in the width direction; and a pair of side surfaces, the pair of side surfaces each include a first side surface formed on a corresponding one of the pillar parts; and a second side surface formed so as to continue from the first side surface, and located more on an inner circumference side of the ring than the first side surface, a pair of the first side surfaces each are formed so as to be inclined toward an inner side of a corresponding one of the pillar parts with respect to an extending direction, from an inner circumference side to an outer circumference side of the ring, of a corresponding one of the second side surfaces continuing from the first side surface, and a pair of the second side surfaces is formed such that the second side surfaces are spaced farther apart from each other as the second side surfaces extend from the inner circumference side to the outer circumference side of the ring, and that an angle formed between the pair of the second side surfaces is larger by 0.2 to 0.8 degrees than an opening angle of the V-shaped grooves of the pulleys.

In an element having a pair of pillar parts on both sides in a width direction of a saddle surface with which a ring comes into contact, upon torque transmission, a force (compression force) from a pulley acts on a pair of side surfaces and a force (tension) from the ring acts on a central portion in the width direction of the saddle surface from an outer circumference side to an inner circumference side of the ring. At this time, the element is significantly deformed by the force from the ring acting on the central portion in the width direction of the saddle surface toward the inner circumference side, and a bias occurs in contact pressure (surface pressure) between the pair of side surfaces and the pulley. As a result, the pair of side surfaces swings (pitches) in a front-back direction when receiving a force in a tangential direction from the pulley, causing local wear in each side surface of the element. The inventors of the present application have found by study that by forming an element such that a pair of first side surfaces each are inclined toward an inner side of a pillar part with respect to an extending direction, from an inner circumference side to an outer circumference side of a ring, of a second side surface continuing from the first side surface, a pair of second side surfaces is spaced farther apart from each other as they extend from the inner circumference side to the outer circumference side of the ring, and an angle formed between the pair of second side surfaces is larger by 0.2 to 0.8 degrees than an opening angle of the V-shaped grooves of the pulleys, upon torque transmission, the pair of second side surfaces becomes substantially parallel to contact surfaces (inclined surfaces) of the pulley with the element being deformed, and a bias in contact pressure between the pair of side surfaces and the pulley occurring when the pair of side surfaces (second side surfaces) receives a force in a tangential direction from the pulley is reduced. By this, a resistance force (anti-pitching moment) by friction between the element and the pulley can be increased, and pitching of the element is excellently suppressed, enabling to reduce local wear of the pair of side surfaces that come into contact with the V-shaped groove of the pulley.

A continuously variable transmission of the present disclosure is a continuously variable transmission including: a pair of pulleys; and a transmission belt including a plurality of elements and a ring that circularly puts together the plurality of elements, the transmission belt being wound around V-shaped grooves of the pair of pulleys, and the main points are that the elements each include a body part including a saddle surface that comes into contact with the ring; a pair of pillar parts extending from both sides in a width direction of the saddle surface in the width direction; and a pair of side surfaces, the pair of side surfaces each include a first side surface formed on a corresponding one of the pillar parts; and a second side surface formed so as to continue from the first side surface, and located more on an inner circumference side of the ring than the first side surface, a pair of the first side surfaces each are formed so as to be inclined toward an inner side of a corresponding one of the pillar parts with respect to an extending direction, from an inner circumference side to an outer circumference side of the ring, of a corresponding one of the second side surfaces continuing from the first side surface, and a pair of the second side surfaces is formed such that the second side surfaces are spaced farther apart from each other as the second side surfaces extend from the inner circumference side to the outer circumference side of the ring, and that an angle formed between the pair of second side surfaces is larger by 0.2 to 0.8 degrees than an opening angle of the V-shaped grooves of the pulleys.

The continuously variable transmission of the present disclosure includes the above-described transmission belt of the present disclosure. Hence, the continuously variable transmission of the present disclosure can provide the same advantageous effect as the transmission belt of the present disclosure, i.e., an advantageous effect of being able to reduce local wear of a pair of side surfaces that come into contact with the V-shaped groove of the pulley.

A method for designing an element of the present disclosure is a method for designing a plurality of elements of a transmission belt that includes the plurality of elements each including a body part, a pair of side surfaces located at both edges in a width direction of the body part, and a saddle surface located between the pair of side surfaces in the width direction; and a ring that circularly puts together the plurality of elements by an inner circumferential surface of the ring coming into contact with each of the saddle surfaces of the plurality of elements, and that is wound around V-shaped grooves of a pair of pulleys of a continuously variable transmission to transmit power, and the main points are that a pulleys' specification including an opening angle of the pulleys, an elements' specification including flank angles, each being an angle formed between the pair of side surfaces, and an analysis condition including input torque of the continuously variable transmission are set, and by analysis based on the pulleys' specification, the elements' specification, and the analysis condition, distributions of friction forces in a radial direction of the ring exerted between the pair of side surfaces and the pulleys are derived for a plurality of different flank angles, rotational moments at a center of pitching of the elements are derived for the plurality of flank angles from friction force distributions derived for the plurality of flank angles, and a flank angle suitable for the continuously variable transmission is determined based on the rotational moments derived for the plurality of flank angles.

In the method for designing an element of the present disclosure, a pulleys' specification including an opening angle of the pulleys, an elements' specification including flank angles, each being an angle formed between a pair of side surfaces, and an analysis condition including input torque of the continuously variable transmission are set, and by analysis based on the pulleys' specification, the elements' specification, and the analysis condition, friction force distributions (distributions of friction forces in a ring radial direction) between the pair of side surfaces and the pulleys are derived for a plurality of different flank angles, rotational moments at the center of pitching of the elements are derived for the plurality of flank angles from the derived friction force distributions, and a flank angle suitable for the continuously variable transmission is determined based on the derived rotational moments. The rotational moment at the center of pitching of the element corresponds to a resistance force by a friction force exerted when the element receives a force from the pulley, and thus, by determining a flank angle based on the rotational moment, pitching of the element can be excellently suppressed, enabling to reduce local wear of the pair of side surfaces that come into contact with the V-shaped groove of the pulley.

A method for producing an element of the present disclosure is a method for producing a plurality of elements of a transmission belt that includes the plurality of elements each including a body part, a pair of side surfaces located at both edges in a width direction of the body part, and a saddle surface located between the pair of side surfaces in the width direction; and a ring that circularly puts together the plurality of elements by an inner circumferential surface of the ring coming into contact with each of the saddle surfaces of the plurality of elements, and that is wound around V-shaped grooves of a pair of pulleys of a continuously variable transmission to transmit power, and the main points are that a pulleys' specification including an opening angle of the pulleys, an elements' specification including flank angles, each being an angle formed between the pair of side surfaces, and an analysis condition including input torque of the continuously variable transmission are set, and by analysis based on the pulleys' specification, the elements' specification, and the analysis condition, distributions of friction forces in a radial direction of the ring exerted between the pair of side surfaces and the pulleys are derived for a plurality of different flank angles, rotational moments at a center of pitching of the elements are derived for the plurality of flank angles from friction force distributions derived for the plurality of flank angles, a flank angle suitable for the continuously variable transmission is determined based on the rotational moments derived for the plurality of flank angles, a die is formed based on the determined flank angle, and outside shapes of the elements are formed by performing press working using the formed die.

The method for producing an element of the present disclosure includes the above-described method for designing an element. Hence, the method for producing an element of the present disclosure can provide the same advantageous effect as the method for designing an element of the present disclosure, i.e., an advantageous effect of being able to reduce local wear of a pair of side surfaces that come into contact with the V-shaped groove of the pulley.

DESCRIPTION OF EMBODIMENTS

Next, modes for carrying out various aspects of the present disclosure will be described with reference to the drawings.

Figure 1:
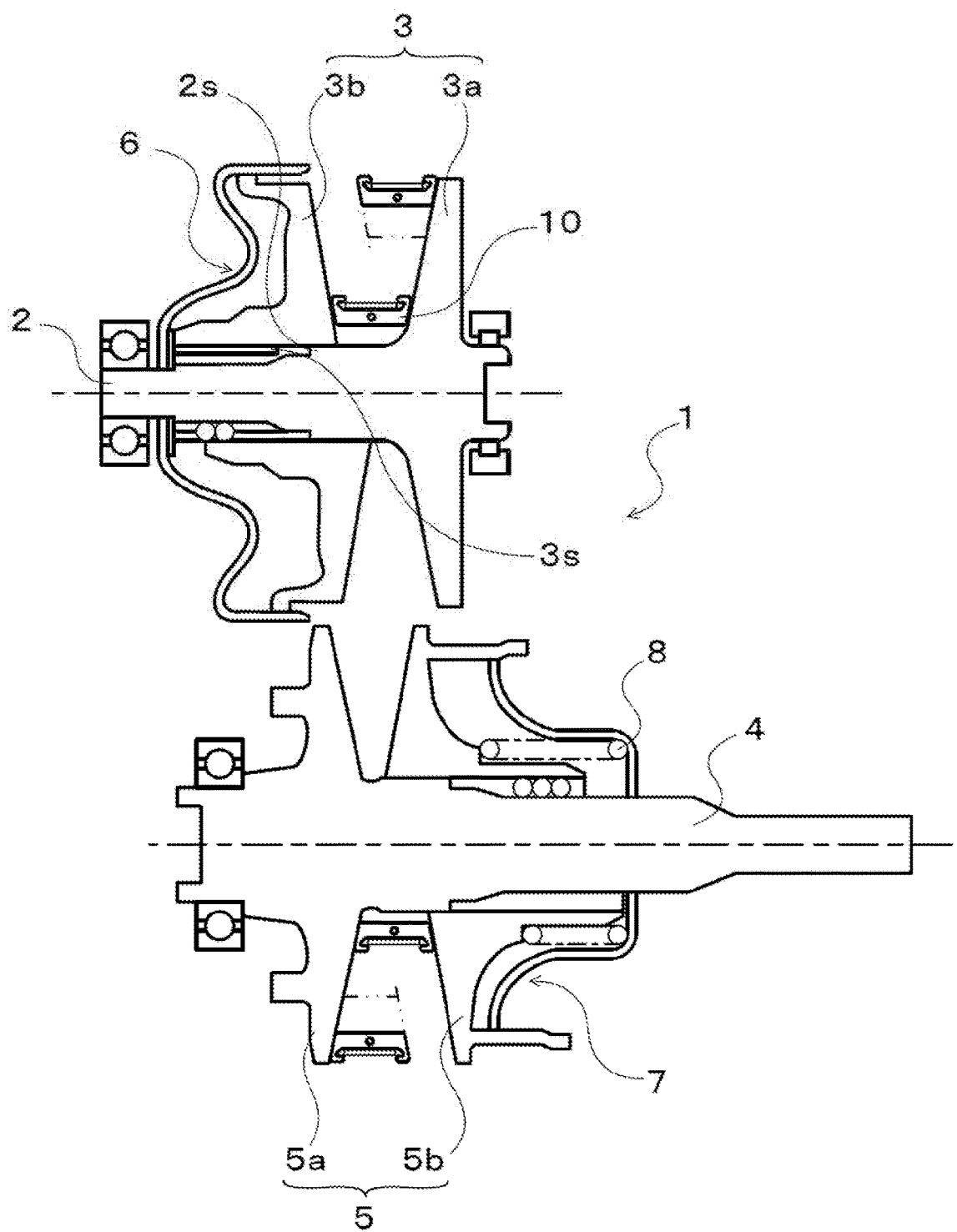
FIG. 1 is a schematic configuration diagram of a continuously variable transmission 1 of the present embodiment.

FIG. 1 is a schematic configuration diagram of a continuously variable transmission 1 of the present embodiment. The continuously variable transmission 1 is mounted on a vehicle and includes, as shown in the drawing, a primary shaft 2 serving as a driving-side rotating shaft; a primary pulley 3 provided on the primary shaft 2; a secondary shaft 4 serving as a driven-side rotating shaft and disposed parallel to the primary shaft 2; a secondary pulley 5 provided on the secondary shaft 4; and a transmission belt 10 wound around a pulley groove (V-shaped groove) of the primary pulley 3 and a pulley groove (V-shaped groove) of the secondary pulley 5.

The primary shaft 2 is coupled through a forward/reverse switching mechanism (not shown) to an input shaft (not shown) coupled to a power source such as an engine (internal combustion engine). The primary pulley 3 includes a fixed sheave 3a which is formed integrally with the primary shaft 2; and a moving sheave 3b which is axially and slidably supported on the primary shaft 2 through a ball spline, etc. In addition, the secondary pulley 5 includes a fixed sheave 5a which is formed integrally with the secondary shaft 4; and a moving sheave 5b which is axially and slidably supported on the secondary shaft 4 through a ball spline, etc., and which is axially biased by a return spring 8.

Furthermore, the continuously variable transmission 1 includes a primary cylinder 6 which is a hydraulic actuator for changing the groove width of the primary pulley 3; and a secondary cylinder 7 which is a hydraulic actuator for changing the groove width of the secondary pulley 5. The primary cylinder 6 is formed behind the moving sheave 3b of the primary pulley 3, and the secondary cylinder 7 is formed behind the moving sheave 5b of the secondary pulley 5. Hydraulic oil is supplied to the primary cylinder 6 and the secondary cylinder 7 from a hydraulic control device (not shown) in order to change the groove widths of the primary pulley 3 and the secondary pulley 5, by which the speed of torque transmitted to the primary shaft 2 from the engine, etc., through the input shaft and the forward/reverse switching mechanism is steplessly changed, and the torque can be outputted to the secondary shaft 4. The torque outputted to the secondary shaft 4 is transmitted to drive wheels of the vehicle through a gear mechanism, a differential gear, and a drive shaft (none of which are shown).

Figure 2:
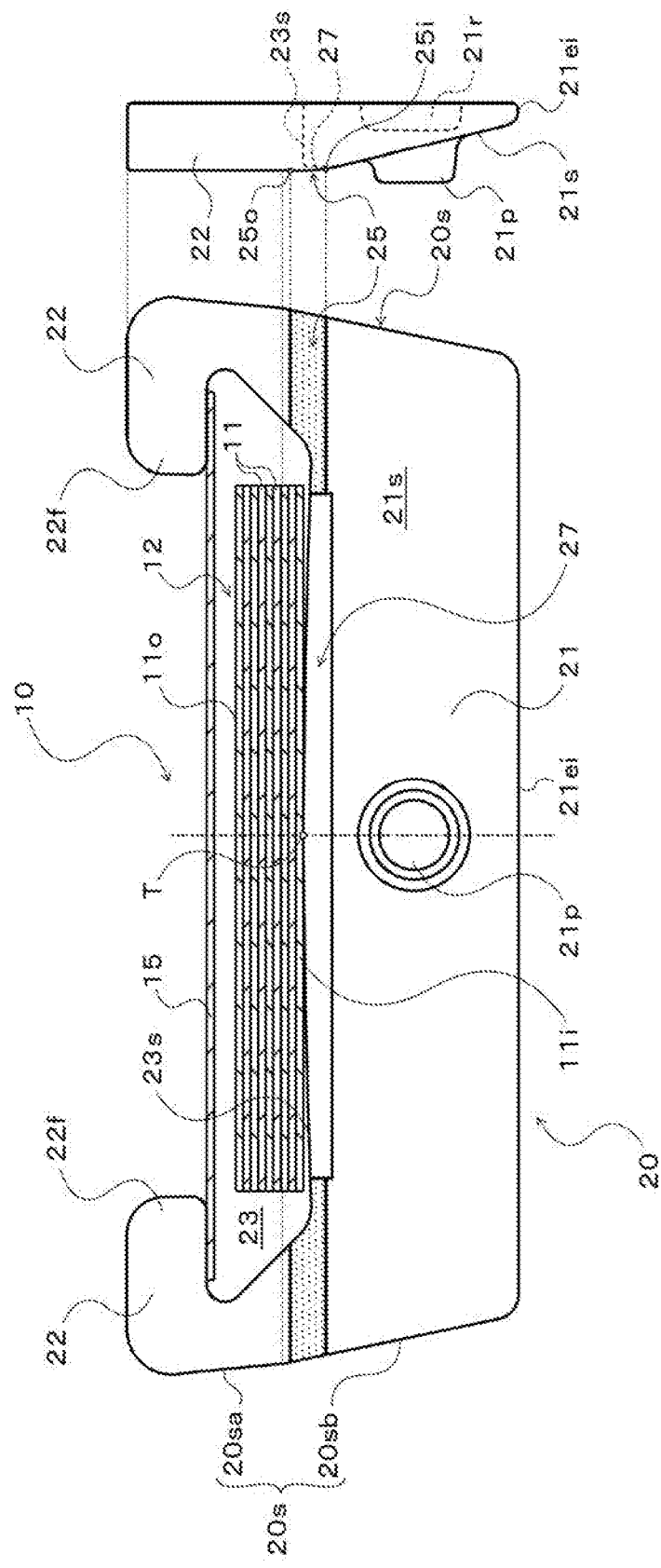
FIG. 2 is a partial cross-sectional view of a transmission belt 10 included in the continuously variable transmission 1.

FIG. 2 is a partial cross-sectional view of the transmission belt 10. As shown in the drawing, the transmission belt 10 includes a single layered ring 12 formed by layering a plurality of (e.g., nine in the present embodiment) endless ring materials 11 in a thickness direction (ring diameter direction); a single endless retainer ring 15; and a plurality of (e.g., several hundred in total) elements 20 which are circularly arranged (put together) along an inner circumferential surface of the layered ring 12.

The plurality of ring materials 11 forming the layered ring 12 each are an elastically deformable material cut out of a drum made of steel sheet, and are processed so as to have roughly the same thickness and have different circumference lengths which are predetermined for the respective ring materials 11. The retainer ring 15 is, for example, an elastically deformable ring cut out of a drum made of steel sheet, and is processed so as to have roughly the same thickness as or a thinner thickness than the ring materials 11 and have a longer inner circumference length than an outer circumference length of a ring material 11 that is the outermost layer of the layered ring 12. By this, in a state in which the layered ring 12 and the retainer ring 15 are concentrically disposed (a no load state in which tension does not act), as shown in FIG. 2, a circular clearance is created between an outer circumferential surface of the ring material 11 that is the outermost layer and an inner circumferential surface of the retainer ring 15.

Each element 20 is, for example, stamped out from a steel sheet by press working. As shown in FIG. 2, the element 20 includes a body part 21 extending horizontally in the drawing; a pair of pillar parts 22 extending from both edge parts of the body part 21 in the same direction; and a single ring holding part (depressed part) 23 defined between the pair of pillar parts 22 so as to open on free end sides of the respective pillar parts 22.

An edge 21ei of the body part 21 which is on an inner side (inner circumference side) in a radial direction of the layered ring 12 is formed in flat shape in a width direction.

The pair of pillar parts 22 extends outward in the radial direction of the layered ring 12 (in a direction going from the inner circumference side to the outer circumference side of the transmission belt 10 (layered ring 12), i.e., upward in the drawing) from both sides in the width direction of a saddle surface 23s which is the bottom of the ring holding part 23, and a hook part 22f that protrudes in the width direction of the saddle surface 23s is formed at a free end part of each pillar part 22. The pair of hook parts 22f extends so as to face each other with a spacing therebetween that is slightly longer than the width of the layered ring 12 (ring materials 11) and is shorter than the width of the retainer ring 15.

As shown in FIG. 2, the layered ring 12 is disposed in the ring holding part 23, and the saddle surface 23s of the ring holding part 23 comes into contact with the inner circumferential surface of the layered ring 12, i.e., an inner circumferential surface of a ring material 11 that is the innermost layer. The saddle surface 23s is formed in left-right symmetrical convex curved surface shape (crowning shape) that is gently inclined downward in the drawing as the saddle surface 23s extends outward in the width direction, with a central potion thereof in the width direction being a top portion T. By this, a centripetal force directed toward the top portion T is given to the layered ring 12 by friction with the saddle surface 23s, enabling to center the layered ring 12. Note, however, that the saddle surface 23s may include a plurality of convex curved surfaces in the width direction that are curved outward in the radial direction of the layered ring 12.

In addition, the elastically deformed retainer ring 15 is allowed to fit into the ring holding part 23 from a portion between the pair of hook parts 22f of the element 20. The retainer ring 15 is disposed between the outer circumferential surface of the ring material 11 that is the outermost layer of the layered ring 12 and the hook parts 22f of the element 20, enclosing the layered ring 12, and restricts, together with the pair of pillar parts 22, the element 20 from falling off the layered ring 12 or the layered ring 12 from falling off the element 20. By this, the plurality of elements 20 are circularly put together (arranged) along the inner circumferential surface of the layered ring 12. In the present embodiment, a single or a plurality of openings (slots) which are not shown are made in the retainer ring 15, by which the retainer ring 15 is easily elastically deformed, enabling to secure attachability to the elements 20.

On the front (one surface) of the element 20 there are formed, as shown in FIG. 2, a pair of locking edge parts (contact areas) 25, a non-contact part 27, a tapered surface (inclined surface) 21s, and a single protrusion (dimple) 21p. The pair of locking edge parts 25 is formed on the front of the element 20 with a spacing therebetween in the width direction of the saddle surface 23s so as to be placed across their corresponding pillar parts 22 and the body part 21. In addition, the non-contact part 27 is formed between the pair of locking edge parts 25 in the above-described width direction. Furthermore, the tapered surface 21s is formed on the front (one surface) of the body part 21 so as to extend from the non-contact part 27 and the pair of locking edge parts 25 to an opposite side to a protruding direction of each pillar part 22, i.e., a belt's inner circumference side (a lower side in FIG. 2). The protrusion 21p protrudes from the tapered surface 21s at a central portion in a width direction of the front of the body part 21.

In addition, as shown in FIG. 2, a portion of the front of the element 20 (mainly, the front of the pillar parts 22) and a portion of the back (the other surface) of the element 20 that are located more on a belt's outer circumference side than each locking edge part 25 and the non-contact part 27 are formed to be flat. By this, each pillar part 22 of the element 20 has a certain thickness. In addition, as shown in FIG. 2, the tapered surface 21s which is located more on the belt's inner circumference side (the lower side in FIG. 2) than each locking edge part 25 and the non-contact part 27 gets closer to the back (back side) as the tapered surface 21s is distanced from the pillar parts 22 (as the tapered surface 21s extends toward the belt's inner circumference side). Furthermore, a recessed part 21r is formed on the back of the element 20 (the body part 21) so as to be located on a back side of the protrusion 21p. When the transmission belt 10 is assembled, a protrusion 21p of an adjacent element 20 loosely fits into the recessed part 21r.

Each locking edge part 25 has a short, belt-shaped convex curved surface. In the present embodiment, each locking edge part 25 has a cylindrical surface (curved surface) having a predetermined radius of curvature. Each locking edge part 25 includes a pivot (line of contact) about which the element 20 and an adjacent element 20 rotate by coming into contact with each other, and the location of the pivot changes between an outer circumference side edge part 25o of the locking edge part 25 (a boundary line between the front of the pillar part 22 and the locking edge part 25) and an inner circumference side edge part 25i of the locking edge part 25 (a boundary line between the tapered surface 21s and the locking edge part 25), according to a transmission gear ratio y of the continuously variable transmission 1.

In addition, the non-contact part 27 is a belt-shaped depressed part formed on the front (one surface) of the body part 21 so as to open at the saddle surface 23s in a state in which the element 20 and an adjacent element 20 are in contact with each other, and to extend in the width direction along the saddle surface 23s to cut off the pair of locking edge parts 25. The bottom of the non-contact part 27 is a flat surface parallel to the front (mainly, the front of the pillar parts 22) and back of the element 20, and is recessed more on the back side than a surface of each locking edge part 25. By this, the thickness of the saddle surface 23s becomes smaller than the thickness of the pillar parts 22. In addition, corner parts of the non-contact part 27 (depressed part) and an edge part of the body part 21 that defines the non-contact part 27 are given an R shape by chamfering, etc.

By forming such a non-contact part 27 in the element 20, in the transmission belt 10, it becomes possible to excellently suppress contact between the element 20 and an adjacent element 20 at portions other than the locking edge parts 25. As a result, deformation of the adjacent element 20 is suppressed which is caused by application of a load from the central portion in the width direction of the element 20 on which a large moment acts to the adjacent element 20, enabling to further improve the durability of the elements 20.

Figure 3:
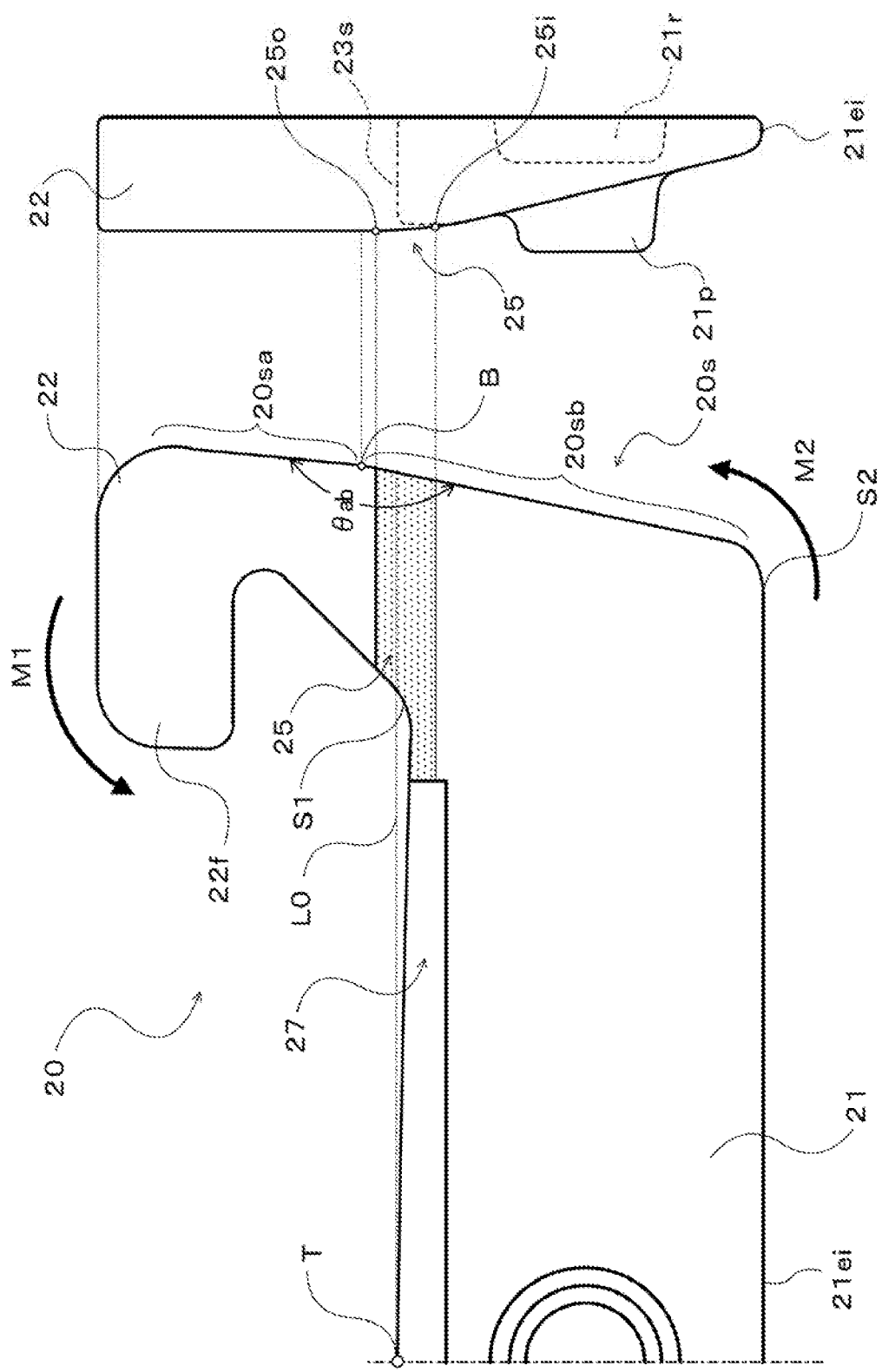
FIG. 3 is an enlarged view of an element 20 included in the transmission belt 10.

In addition, the element 20 has a pair of side surfaces 20s formed so as to be spaced farther apart from each other as they extend from the inner circumference side to the outer circumference side of the layered ring 12 (the outer side in the radial direction of the layered ring 12). As shown in FIGS. 2 and 3, each side surface 20s has a first side surface 20sa located on a pillar part 22 side, i.e., on an opposite side (outer side) to an inner surface 22i of the pillar part 22; and a second side surface 20sb formed so as to continue from the first side surface 20sa, and located more on the inner side in the radial direction of the layered ring 12 than the first side surface 20sa. In the present embodiment, a pair of the first side surfaces 20sa is formed so as to be spaced farther apart from each other as they extend toward the outer side in the radial direction of the layered ring 12 as with the second side surfaces 20sb, and is formed such that, as shown in FIG. 3, an angle θab formed between the first side surface 20sa and the second side surface 20sb is less than 180 degrees at a boundary (B) between the first side surface 20sa and the second side surface 20sb, i.e., the first side surface 20sa is inclined toward the inner side of the pillar part 22 with respect to an extending direction, from the inner circumference side to the outer circumference side of the layered ring 12, of the second side surface 20sb. By this, the strength of each pillar part 22 can be excellently secured.

Figure 4:
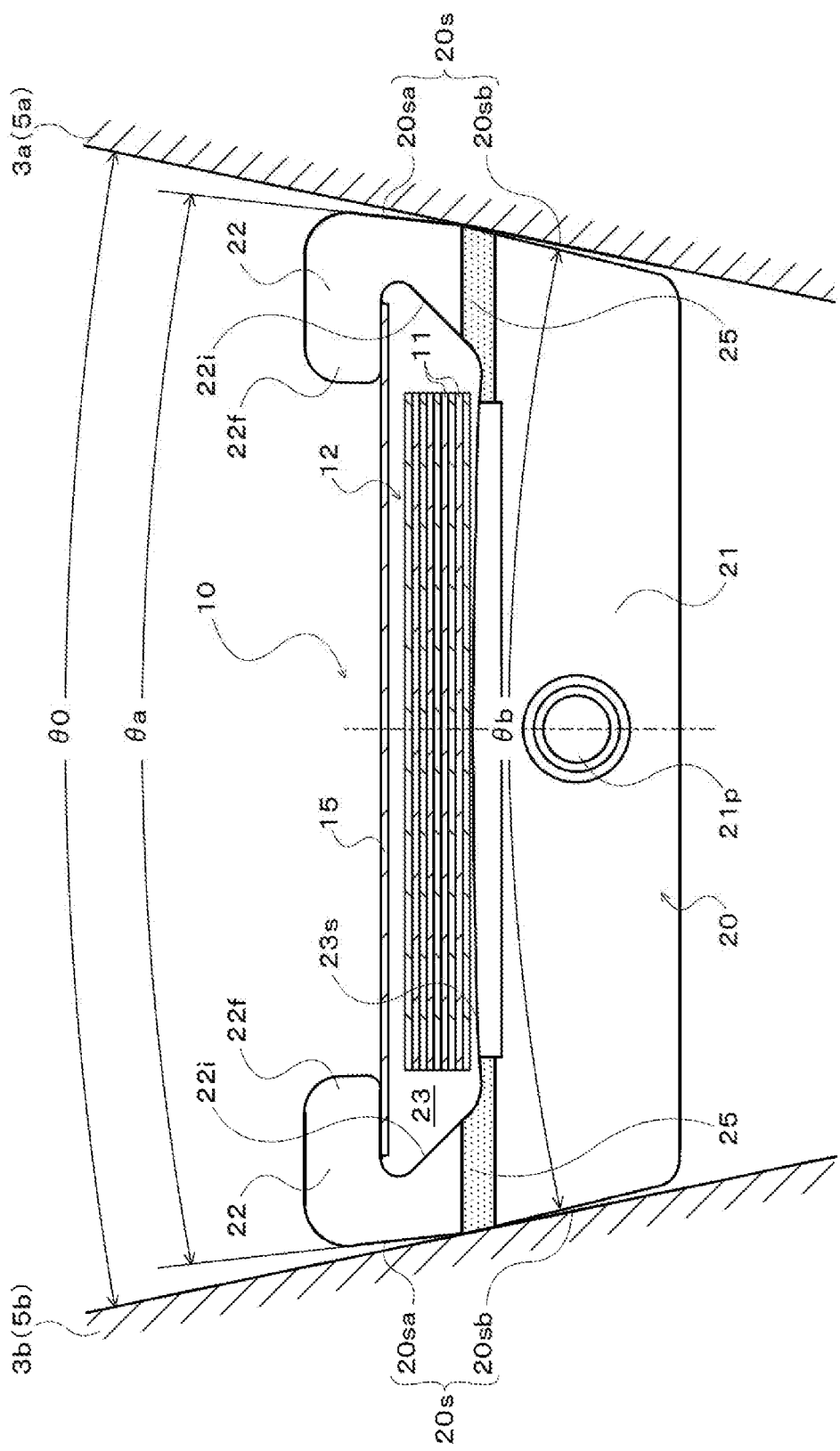
FIG. 4 is a partial cross-sectional view of the transmission belt 10.

Furthermore, an angle θb (flank angle) formed between a pair of the second side surfaces 20sb is, as shown in FIG. 4, larger than an opening angle θO of the pulley grooves of the primary pulley 3 and the secondary pulley 5. In the present embodiment, the angle θb is determined to be larger by 0.2 to 0.8 degrees than the opening angle θO. On the other hand, an angle θa formed between a pair of the first side surfaces 20sa is determined to be smaller than the opening angle θO of the pulley grooves. By this, the second side surfaces 20sb of the element 20 come into frictional contact with the surfaces of the pulley groove of the primary pulley 3 or the pulley groove of the secondary pulley 5, and thereby receive a compression force from the pulley 3 or 5, and become torque transmission surfaces (flank surfaces) that transmit torque from the primary pulley 3 to the secondary pulley 5 by a friction force in a tangential direction of the pulleys 3 and 5. On the other hand, when torque is transmitted from the primary pulley 3 to the secondary pulley 5 by the transmission belt 10, a pair of the first side surfaces 20sa basically does not come into contact with the surfaces of the pulley groove. In addition, as shown in FIG. 3, the boundary B between the first side surface 20sa and the second side surface 20sb is located more on the belt's outer circumference side than the outer circumference side edge part 25o of the locking edge part 25 when the element 20 is viewed in plan view.

When torque is transmitted from the primary pulley 3 to the secondary pulley 5 by the transmission belt 10 such as that described above, while the second side surfaces 20sb of the side surfaces 20s of each element 20 abut on the surfaces of the pulley groove, the first side surfaces 20sa on the pillar part 22 side can be prevented from coming into contact with the surfaces of the pulley groove. By this, upon torque transmission from the primary pulley 3 to the secondary pulley 5, a force (compression force) can be prevented from being directly applied to the first side surfaces 20sa, i.e., the pillar parts 22, of each element 20 from the primary pulley 3 or the secondary pulley 5, enabling to suppress deformation of the pillar parts 22.

In addition, since the angle θb formed between a pair of the second side surfaces 20sb abutting on the surfaces of the pulley groove is larger than the opening angle θO of the pulley grooves, when a compression force acting on a pair of the second side surfaces 20sb from the pulley 3 or 5 is small (relatively small torque is transmitted), torque is transmitted such that only the outer side in the radial direction of the layered ring 12 comes into contact with the surfaces (inclined surfaces) of the pulley groove. When the compression force acting on a pair of the second side surfaces 20sb increases (torque to be transmitted increases), by the compression force and a force (tension) acting on the saddle surface 23s from the layered ring 12 from the outer side to the inner side in the radial direction of the layered ring 12, as shown in FIG. 3, a bending moment M1 that tries to fold the pair of pillar parts 22 inward in the width direction of the element 20 and a moment M2 that tries to bend both sides in the width direction of the edge 21ei (an edge part of the body part 21 on the belt's inner circumference side) which is on the opposite side to the saddle surface 23d of the body part 21, toward the belt's outer circumference side occur in each element 20. By this, the element 20 is deformed, and the angle θb formed between a pair of the second side surfaces 20sb decreases due to the deformation of the element 20, and matches the opening angle θO of the pulley grooves in the end. Namely, a pair of the second side surfaces 20sb becomes substantially parallel to the surfaces (inclined surfaces) of the pulley groove, and comes into surface contact with the surfaces of the pulley groove, transmitting torque. Then, when the compression force acting on a pair of the second side surfaces 20sb further increases (torque to be transmitted further increases), a force that tries to deform the element 20 further increases, and although the angle θb formed between a pair of the second side surfaces 20sb is substantially equal to the opening angle θO of the pulley grooves and thus does not change, inner side surfaces, in the radial direction of the layered ring 12, of the element 20 are more strongly pressed against the pulley. Namely, a pair of the second side surfaces 20sb transmits torque, with the inner sides in the radial direction of the layered ring 12 being in strong contact with the surfaces of the pulley groove. In this case, a bias occurs in contact pressure (surface pressure) between a pair of the second side surfaces 20sb and the pulley 3 or 5, and due to the bias in the contact pressure of a pair of the second side surfaces 20sb, pitching which is a swing in a front-back direction (a swing about a pivot which is the location of the center of a load received by the second side surfaces 20sb) occurs in the element 20, by which local wear occurs in a pair of the second side surfaces 20sb.

Figure 5:
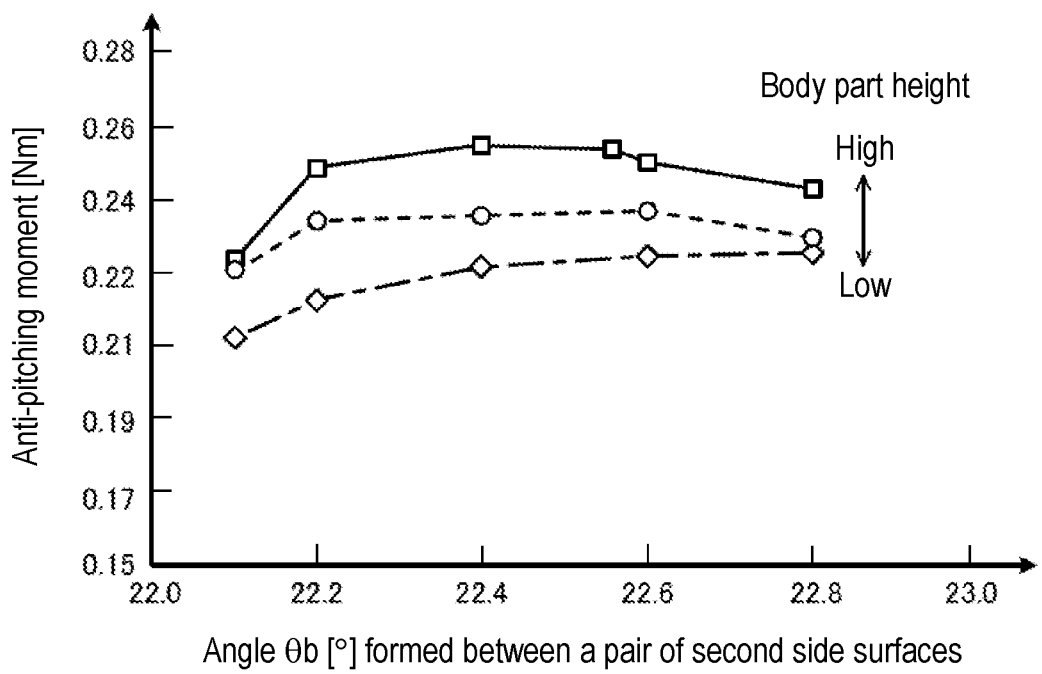
FIG. 5 is an illustrative diagram showing a relationship between the body part height of the element 20, an angle θb formed between a pair of second side surfaces 20sb, and anti-pitching moment.

The inventors of the present application have fabricated a plurality of elements 20 having different angles θb formed between a pair of second side surfaces 20sb (22.1 degrees, 22.2 degrees, 22.4 degrees, 22.6 degrees, and 22.8 degrees), and have analyzed a distribution of contact pressure acting on the pair of second side surfaces 20sb of each element 20 along with torque transmission, calculated normal forces at each location in the belt radial direction on the pair of second side surfaces 20*sb* based on results of the analysis, and thereby derived resistance forces (anti-pitching moments) by friction which are exerted when a force in a tangential direction from an adjacent element 20 (mainly, a force (push-out force) inputted from the adjacent element 20 through the locking edge parts 25) is received. Note that the primary pulley 3 and the secondary pulley 5 that have an opening angle θO of 22.0 degrees have been used. FIG. 5 is an illustrative diagram showing a relationship between the body part height of the element 20, the angle θb formed between the pair of second side surfaces 20*sb*, and anti-pitching moment. Note that in FIG. 5 anti-pitching moments are derived for each of the plurality of elements 20 having different angles θb formed between a pair of second side surfaces 20*sb* and having different heights of a body part 21 (lengths in the belt radial direction), and pieces of derived data for the same body part height are connected by a straight line. A solid line in the drawing represents derived data of anti-pitching moments obtained by using elements 20 with the highest body part height, a dash-dotted line in the drawing represents derived data of anti-pitching moments obtained by using elements 20 with the lowest body part height, and a dashed line in the drawing represents derived data of anti-pitching moments obtained by using elements 20 with an intermediate body part height. As shown in the drawing, it has been found that regardless of the body part height, elements 20 whose angles θb (flank angles) formed between the pair of second side surfaces 20*sb* are larger by 0.2 to 0.8 degrees (particularly, 0.2 to 0.6 degrees) than the opening angle θO (22.0 degrees) of the pulley grooves have high anti-pitching moments. By this, upon torque transmission, by allowing the pair of second side surfaces 20*sb* to become substantially parallel to the surfaces of the pulley groove, when each element 20 is deformed to some extent by the above-described bending moments M1 and M2 (when a compression force from the pulley 3 or 5 exerted on the element 20 is greater than or equal to a predetermined value), a bias in contact pressure of the pair of second side surfaces 20*sb* against the pulley 3 or 5 can be reduced, enabling to excellently suppress local wear of the second side surfaces 20*sb*. In addition, in the present embodiment, since the edge 21*ei* on the inner circumference side of the body part 21 is formed in flat shape in the width direction, in addition to high stiffness of the element 20, by increasing the body part height, the stiffness of the element 20 can be further increased. By this, deformation of the element 20 is suppressed, and thus, the anti-pitching moment increases, enabling to excellently suppress pitching of the element 20.

Furthermore, the boundary B between the first side surface 20*sa* and the second side surface 20*sb* is located more on the outer side (outer circumference side) in the belt radial direction than the outer circumference side edge part 25*o* of the locking edge part 25 of the element 20. By this, the second side surfaces 20*sb* (flank surfaces) extend toward the outer circumference side and the contact area of the second side surfaces 20*sb* with the pulley 3 or 5 increases, and thus, the anti-pitching moment can be increased and pitching of the element 20 can be excellently suppressed. Note, however, that the boundary B between the first side surface 20*sa* and the second side surface 20*sb* may be formed between the outer circumference side edge part 25*o* and the inner circumference side edge part 25*i* of the locking edge part 25, or may be formed on an inner side (inner circumference side) in the belt radial direction than the inner circumference side edge part 25*i* of the locking edge part 25.

In addition, as shown in FIG. 3, the outer circumference side edge part 25*o* of the locking edge part 25 is located more on an outer circumference side than a straight line L0 passing through the top portion T of the saddle surface 23*s* (convex curved surface) and extending in the width direction, and the inner circumference side edge part 25*i* is located more on an inner circumference side than the above-described straight line L0. By this, the locking edge parts 25 are compressed by the pulley 3 or 5 through the second side surfaces 20*sb*, enabling to improve torque transmission efficiency.

Figure 6:
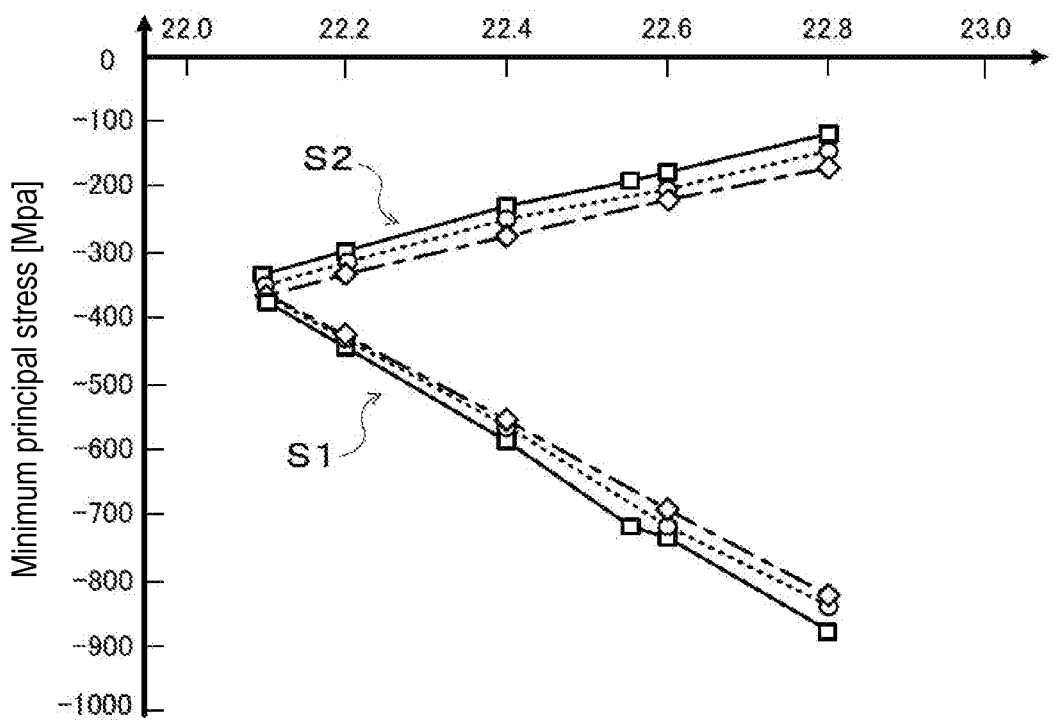
FIG. 6 is an illustrative diagram showing a relationship between the body part height of the element 20, the angle θb formed between the pair of second side surfaces 20sb, and minimum principal stresses.

In addition, the inventors of the present application have further analyzed a minimum principal stress acting on a portion S1 between the saddle surface 23*s* and the inner surface 22*i* of the pillar part 22, and a minimum principal stress acting on an edge part S2 (or a slightly inner side than the edge part S2) in the width direction of the edge 21*ei* of the body part 21. FIG. 6 is an illustrative diagram showing a relationship between the body part height of the element 20, the angle θb formed between a pair of second side surfaces 20*sb*, and minimum principal stresses. Note that in the drawing three lines on the bottom (downward sloping) represent derived data of minimum principal stresses acting on the portion 51 between the saddle surface 23*s* and the inner surface 22*i* of the pillar part 22, and three lines on the top (upward sloping) represent derived data of minimum principal stresses acting on the edge part S2 in the width direction of the edge 21*ei* of the body part 21. Note also that solid lines in the drawing each are a straight line that connects pieces of derived data for the same body part height which are the same as those represented by the solid line in FIG. 5, dash-dotted lines in the drawing each are a straight line that connects pieces of derived data for the same body part height which are the same as those represented by the dash-dotted line in FIG. 5, and dashed lines in the drawing each are a straight line that connects pieces of derived data for the same body part height which are the same as those represented by the dashed line in FIG. 5. It indicates that as the value of a minimum principal stress acting on the portion 51 between the saddle surface 23*s* and the inner surface 22*i* of the pillar part 22 and the value of a minimum principal stress acting on the edge part S2 (or a slightly inner side than the edge part S2) in the width direction of the edge 21*ei* of the body part 21 get closer to each other, a minimum principal stress acting on the weakest portion (in the example of FIG. 6, the minimum principal stress (the compression side is negative) acting on the portion 51 between the saddle surface 23*s* and the inner surface 22*i* of the pillar part 22) can be reduced in absolute value, and shows that deformation of each element 20 upon torque transmission has been able to be excellently suppressed. As shown in the drawing, it has been found that the smaller the angle θb (flank angle) formed between the pair of second side surfaces 20*sb*, i.e., the closer the angle θb is to the opening angle θO of the pulley 3 or 5, a more excellent result is obtained. Therefore, by setting the angle θb (flank angle) formed between the pair of second side surfaces 20*sb* to be larger by 0.2 to 0.8 degrees (more preferably, 0.2 to 0.6 degrees) than the opening angle θO of the pulley grooves of the primary pulley 3 and the secondary pulley 5, deformation of each element 20 upon torque transmission can be excellently suppressed, enabling to excellently suppress local wear of the pair of second side surfaces 20*sb*.

Figure 7:
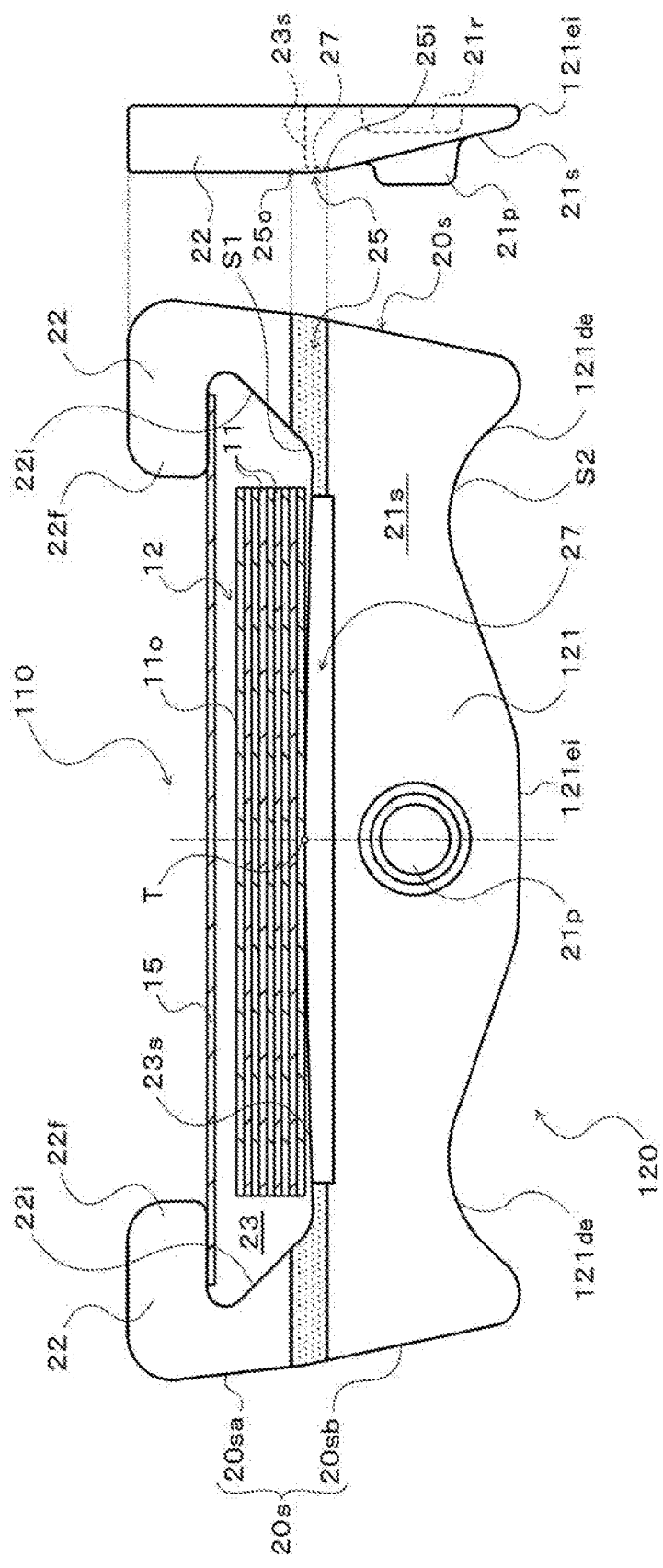
FIG. 7 is a partial cross-sectional view of a transmission belt 110 of another embodiment.

Although in the transmission belt 10 of the continuously variable transmission 1 of the embodiment, the edge 21*ei* on the inner side (the inner circumference side) in the belt radial direction of the body part 21 is formed in flat shape in the width direction, two depressed parts 121*de* that are depressed on a saddle surface 23*s* side may be formed between a central portion in a width direction of an edge 121$ei$ on an inner circumference side of a body part 121 and each of second side surfaces 20$sb$, like an element 120 included in a transmission belt 110 of another embodiment shown in FIG. 7. The two depressed parts 121$de$ are defined by a combination of a concave cylindrical surface and a flat surface, and are formed such that, as shown in FIG. 7, the entire depressed part 121$de$ is closer to the second side surface 20$sb$ than to the central portion in the width direction of the element 120. Note that the two depressed parts 121$de$ may be formed of only a curved surface. By this, without increasing the weight of the element 20, the contact area of the second side surface 20$sb$ with the pulley 3 or 5 can be increased by extending the second side surfaces 20$sb$ (flank surfaces) toward the inner circumference side. As a result, the anti-pitching moment increases, enabling to excellently suppress pitching of the element 20.

Figure 8:
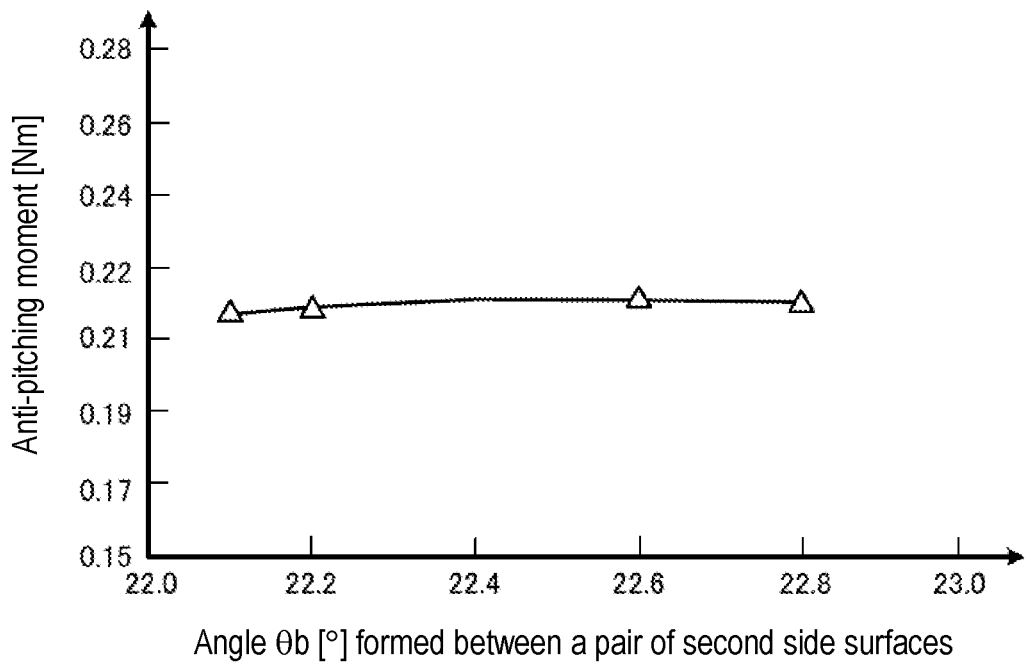
FIG. 8 is an illustrative diagram showing a relationship between the body part height of an element 120 included in the transmission belt 110, an angle θb formed between a pair of second side surfaces 20sb, and anti-pitching moment.
Figure 9:
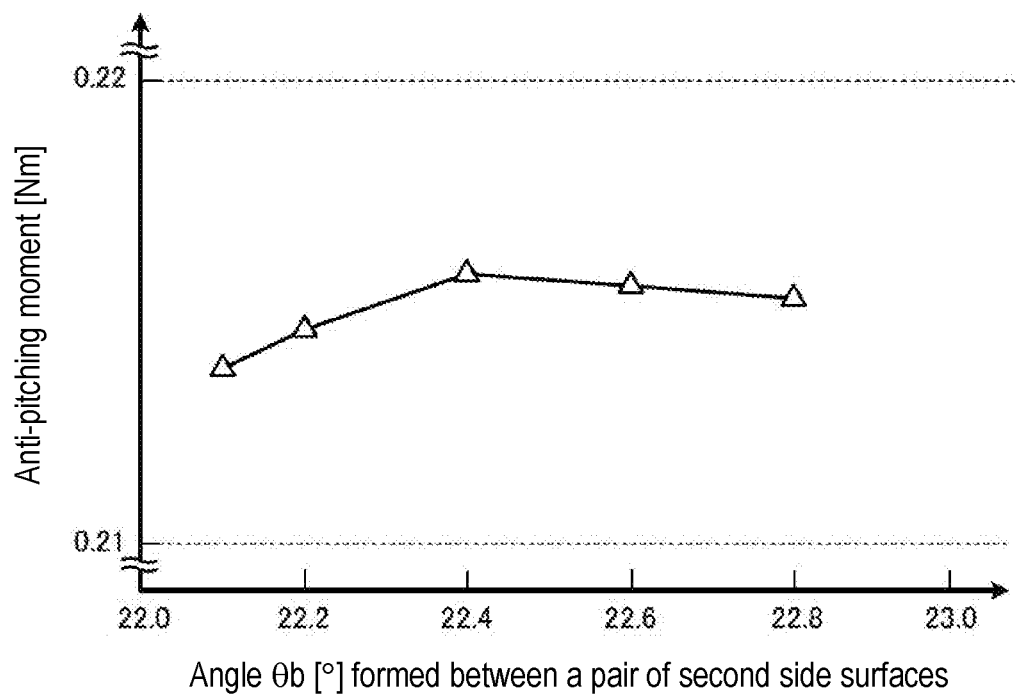
FIG. 9 is an enlarged view in which a scale interval of the anti-pitching moment in FIG. 8 is enlarged.

For the element 120 of a variant that has the two depressed parts 121$de$ on the edge 121$ei$ of the body part 121, the inventors of the present application have fabricated a plurality of elements 120 having different angles $\theta b$ formed between a pair of second side surfaces 20$sb$ (22.1 degrees, 22.2 degrees, 22.4 degrees, 22.6 degrees, and 22.8 degrees), and have analyzed a distribution of contact pressure acting on the pair of second side surfaces 20$sb$ of each element 120 along with torque transmission, and thereby derived anti-pitching moments based on results of the analysis. Note that the pulleys 3 and 5 having an opening angle $\theta O$ of 22.0 degrees have been used. FIG. 8 is an illustrative diagram showing a relationship between the body part height of the element 120, the angle $\theta b$ formed between the pair of second side surfaces 20$sb$, and anti-pitching moment. In addition, FIG. 9 is an enlarged view in which a scale interval (0.21 Nm to 0.22 Nm) of the anti-pitching moment in FIG. 8 is enlarged. As shown in the drawing, it has been found that in the elements 120 of the variant, as with the elements 20 of the embodiment, elements 120 whose angles $\theta b$ (flank angles) formed between the pair of second side surfaces 20$sb$ are larger by 0.2 to 0.8 degrees (particularly, 0.2 to 0.6 degrees) than the opening angle $\theta O$ (22.0 degrees) of the pulley grooves have high anti-pitching moments. By this, upon torque transmission, even if each element 120 is deformed to some extent by the above-described bending moments M1 and M2, a bias in contact pressure of the pair of second side surfaces 20$sb$ against the pulley 3 or 5 can be reduced, enabling to excellently suppress local wear of the second side surfaces 20$sb$.

Figure 10:
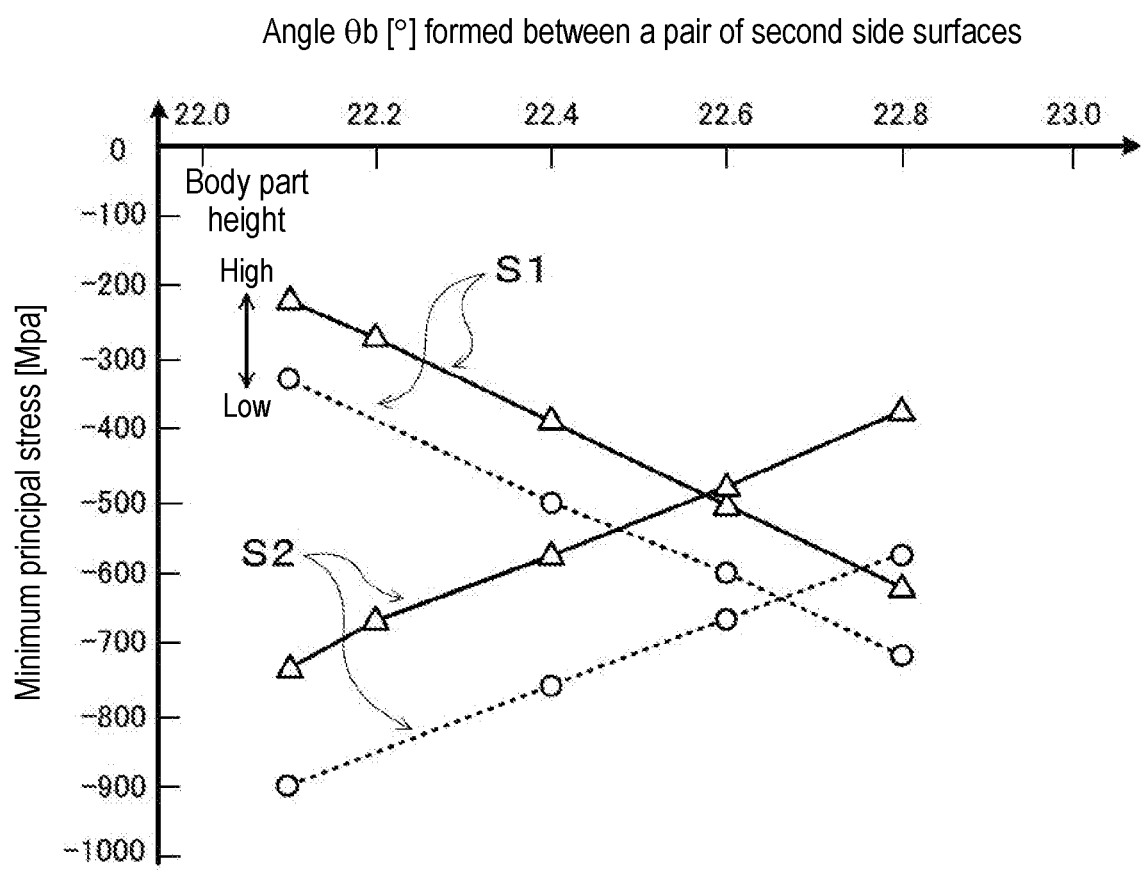
FIG. 10 is an illustrative diagram showing a relationship between the body part height of the element 120, the angle θb formed between the pair of second side surfaces 20sb, and minimum principal stresses.

In addition, the inventors of the present application have further analyzed a minimum principal stress acting on the portion 51 between the saddle surface 23$s$ and the inner surface 22$i$ of the pillar part 22, and a minimum principal stress acting on deepest parts S2 of the two depressed parts 121$de$. FIG. 10 is an illustrative diagram showing a relationship between the body part height of the element 120, the angle $\theta b$ formed between a pair of second side surfaces 20$sb$, and minimum principal stresses. Note that in the drawing two downward-sloping lines represent derived data of minimum principal stresses acting on the portion 51 between the saddle surface 23$s$ and the inner surface 22$i$ of the pillar part 22, and two upward-sloping lines represent derived data of minimum principal stresses acting on the deepest parts S2 of the depressed parts 121$de$. Note also that solid lines in the drawing each are a straight line that connects pieces of derived data obtained by using elements 120 with a high body part height, and dashed lines in the drawing each are a straight line that connects pieces of derived data obtained by using elements 120 with a low body part height. As shown in the drawing, it has been found that regardless of whether the body part height is high or low, when the angle $\theta b$ formed between the pair of second side surfaces 20$sb$ is 22.6 degrees, a minimum principal stress acting on the portion 51 between the saddle surface 23$s$ and the inner surface 22$i$ of the pillar part 22, and a minimum principal stress acting on the deepest parts S2 of the depressed parts 121$de$ get closest to each other, and the minimum principal stress acting on the weakest portion can be reduced in absolute value. Therefore, in the elements 120 of the variant, too, by setting the angle $\theta b$ (flank angle) formed between the pair of second side surfaces 20$sb$ to be larger by 0.2 to 0.8 degrees (more preferably, 0.2 to 0.6 degrees) than the opening angle $\theta O$ of the pulley groove of the primary pulley 3 or the secondary pulley 5, deformation of each element 120 upon torque transmission can be excellently suppressed, enabling to excellently suppress local wear of the pair of second side surfaces 20$sb$.

Figure 11:
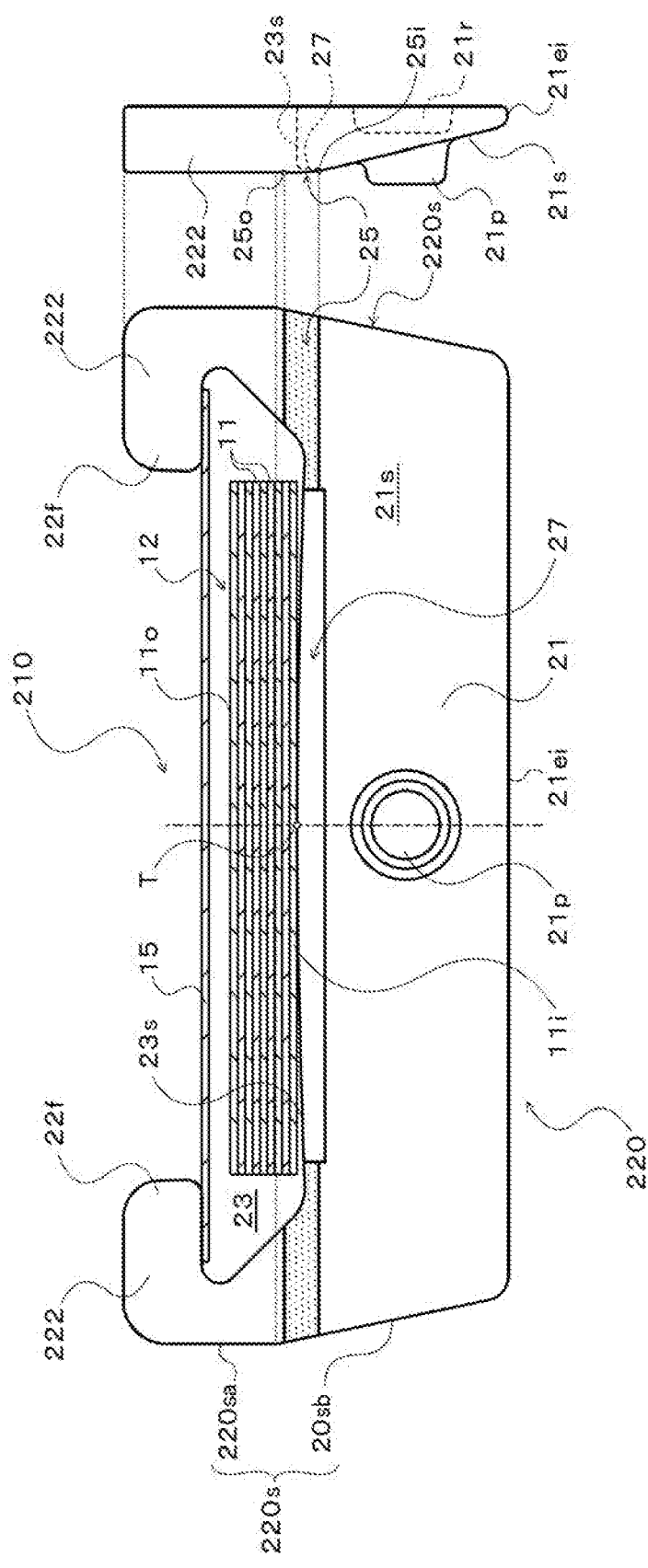
FIG. 11 is a partial cross-sectional view of a transmission belt 210 of another embodiment.

In the transmission belts 10 and 110 of the continuously variable transmissions 1 of the present embodiment and another embodiment, a pair of the first side surfaces 20$sa$ of the element 20 is formed such that, as with the second side surfaces 20$sb$, the first side surfaces 20$sa$ are spaced farther apart from each other as they extend toward the outer side in the radial direction of the layered ring 12, but the configuration is not limited thereto. Namely, like a transmission belt 210 of another embodiment shown in FIG. 11, of a pair of side surfaces 220$s$ of an element 220, a pair of first side surfaces 220$sa$ formed on pillar parts 222 may be formed to be parallel to each other. In addition, the pair of first side surfaces may be formed so as to come closer to each other as they extend toward the outer side in the radial direction of the layered ring 12.

In the transmission belts 10 and 110 of the continuously variable transmissions 1 of the present embodiment and another embodiment, a pair of the second side surfaces 20$sb$ of the element 20 is formed to be a flat surface, but the configuration is not limited thereto. For example, in a pair of the second side surfaces 20$sb$, crank-shaped steps may be formed in the radial direction of the layered ring 12.

In the transmission belts 10 and 110 of the continuously variable transmissions 1 of the present embodiment and another embodiment, a pair of hook parts 22$f$ is provided on each element 20 and the retainer ring 15 is disposed between the layered ring 12 and the hook parts 22$f$ of the plurality of elements 20, but the configuration is not limited thereto. Namely, the hook parts 22$f$ may be omitted from each element 20 of the transmission belt 10, and the retainer ring 15 may be omitted from the transmission belt 10.

Figure 12:
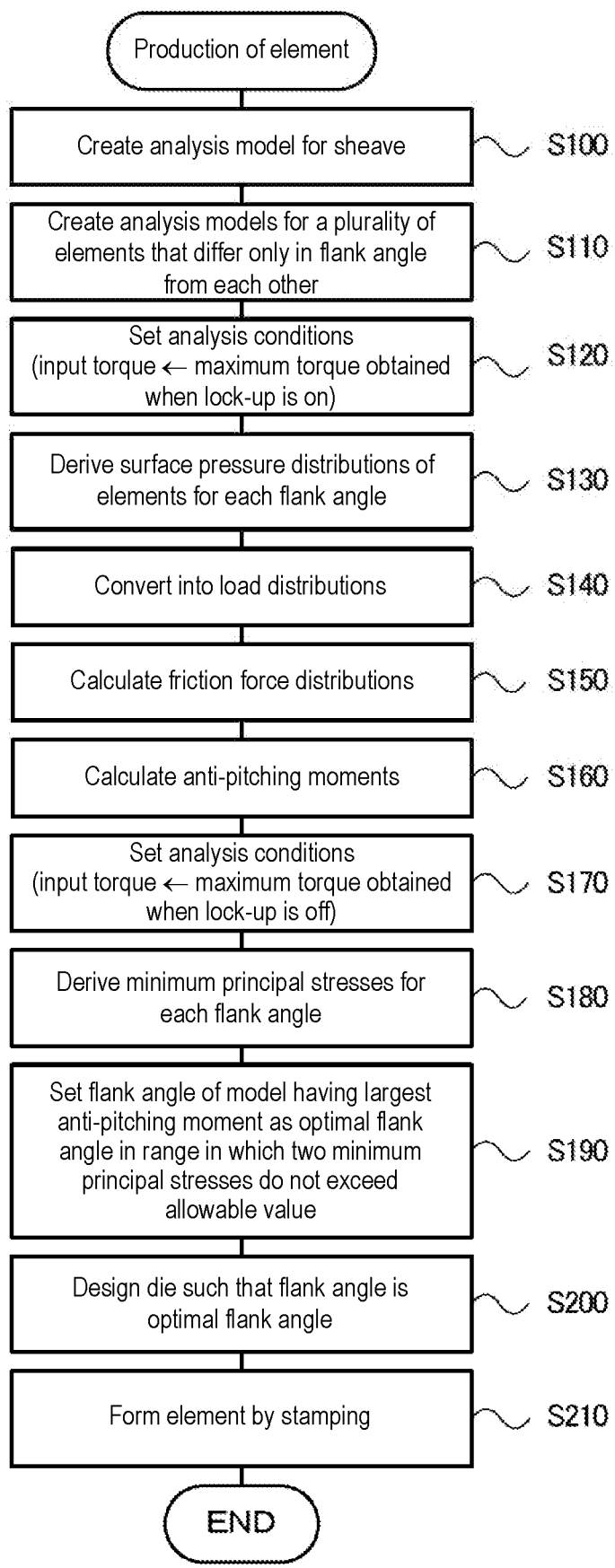
FIG. 12 is an illustrative diagram showing a procedure of production of the element 20.

Now, a method for producing (method for designing) elements 20, 120, and 220 of the embodiment will be described using FIG. 12. The method for producing elements 20, 120, and 220 mainly includes an element design process (step S100 to S190) in which an optimal flank angle $\theta bop$ of the angle $\theta b$ (flank angle) formed between a pair of second side surfaces 20$sb$ of an element 20 is determined by stress analysis from the specifications of the elements 20, 120, and 220, the specifications of the pulleys 3 and 5, and analysis conditions; and an element forming process (step S200 and S210) in which an element 20 is formed by stamping out a steel sheet such that the flank angle has the determined optimal flank angle $\theta bop$.

Figure 13:
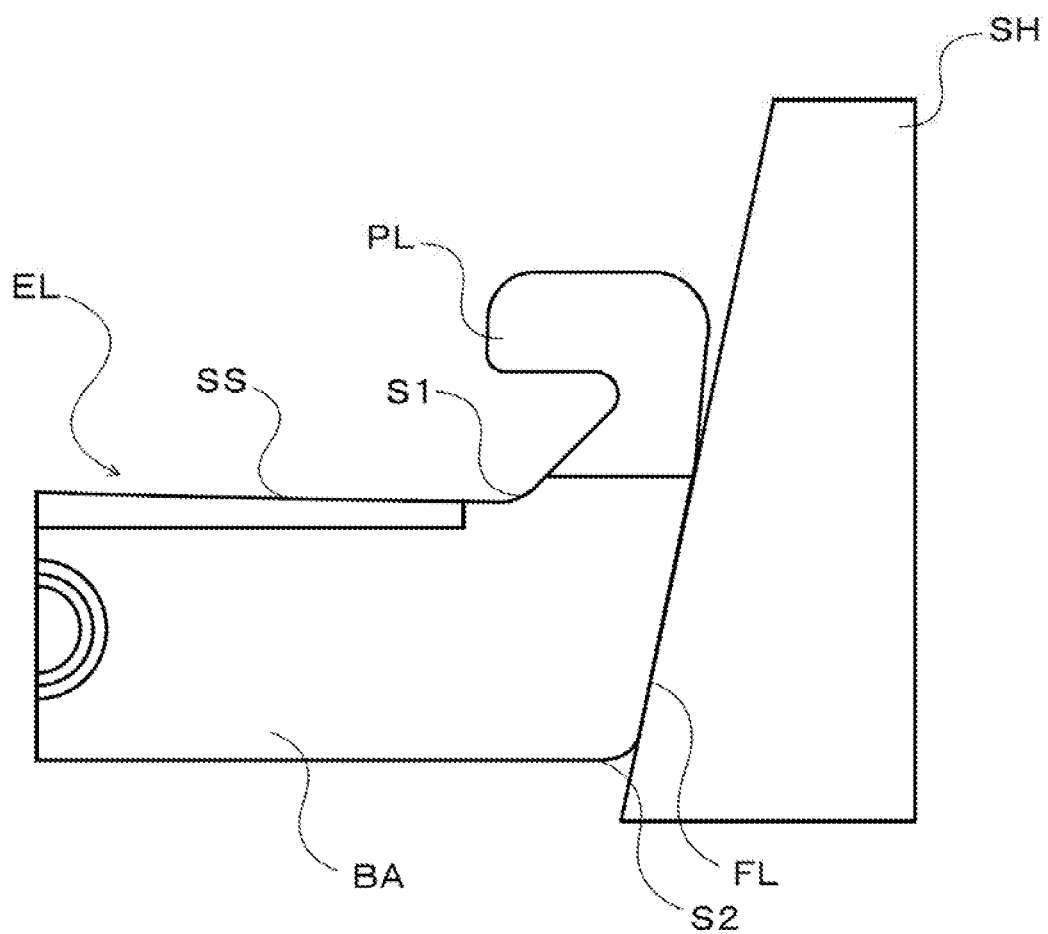
FIG. 13 is an illustrative diagram showing an example of analysis models for a sheave (pulley) and an element.

In the element design process, first, an analysis model for a sheave (pulley) is created (step S100) and analysis models for a plurality of elements that differ only in flank angle from each other are created (step S110). FIG. 13 is an illustrative diagram showing an example of analysis models for a sheave (pulley) SH and an element EL. The analysis model for the sheave includes the outside and inside diameters of the sheave SH, the thickness of the sheave SH in a traveling direction of the element EL (a direction from back to front in FIG. 13), the angle of a contact surface (inclined surface) with the element EL, a material, etc. In addition, the analysis model for the element EL includes the shape, flank angle, material, etc., of the element EL. In the present embodiment, as shown in FIG. 13, the analysis model for the sheave (pulley) and the analysis model for the element are half models in which one side is omitted relative to a center line Lp passing through a central portion in a width direction of the element EL and extending in a radial direction of a ring, and stress analysis is performed using a single element EL. Subsequently, analysis conditions used when stress analysis is performed are set (step S120). Here, the setting of analysis conditions includes the setting of constraint conditions for the sheave SH and the element EL, the setting of a contact surface between the sheave SH and the element EL, the setting of load conditions of the element EL, etc. In the present embodiment, the setting of constraint conditions is performed such that the inside diameter of the sheave SH is constrained for all directions, a second side surface FL of the element EL is constrained in the traveling direction of the element EL, and the central portion in the width direction of the element EL is constrained in this width direction. The setting of a contact surface between the sheave SH and the element EL includes the setting of a range in a belt radial direction of a contact surface between the sheave SH and the element EL. The load conditions of the element EL are conditions related to a load received by a saddle surface SS of the element EL from the ring inward in a radial direction thereof The setting of load conditions includes the setting of input torque inputted to the sheave SH (a sheave included in a primary pulley), and the setting of a transmission gear ratio. For the setting of input torque, in the present embodiment, a configuration is assumed in which a crankshaft of an engine is connected to a primary shaft (primary pulley) of a continuously variable transmission through a lock-up torque converter, and maximum torque that can be inputted to the primary shaft from the engine when lock-up is on (upon non-stalling) (torque obtained by multiplying engine's maximum torque by the amplification factor of the torque converter) is set. In addition, in the setting of a transmission gear ratio, in the present embodiment, a maximum reduction ratio that can be taken by the continuously variable transmission is set. Note that in the analysis conditions, hydraulic pressure from a hydraulic control device that is required to transmit torque set in the setting of torque from the sheave SH to the element EL is set with a safety factor of 1.0 (hydraulic pressure just appropriate to input torque).

Figure 14:
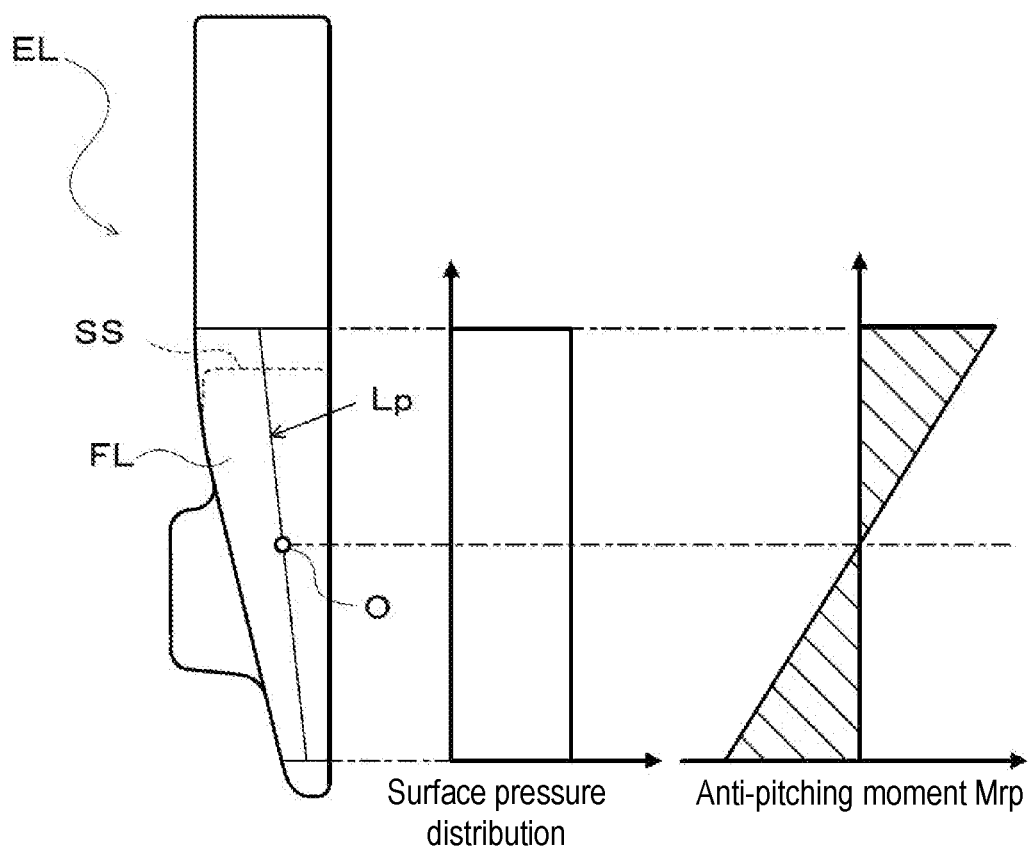
FIG. 14 is an illustrative diagram showing a relationship between a distribution of surface pressure received by a second side surface 20sb of an element 20 from a pulley and anti-pitching moment.

Then, based on the analysis models for the sheave SH and the elements EL and the analysis conditions, stress analysis is performed for each of the plurality of elements EL having different flank angles, and distributions (surface pressure distributions) of contact pressure (surface pressure) received by the second side surface FL of each element EL at each location in a belt radial direction from the sheave SH are extracted (step S130). For the surface pressure distributions, in the present embodiment, as shown in FIG. 14, a surface pressure at a central portion in a plate thickness direction of the second side surface FL of the element EL (a surface pressure received at a location on the straight line Lp extending in the ring radial direction so as to pass through the central portion in the plate thickness direction) is extracted as a representative value. Of course, a surface pressure may be extracted at a plurality of locations in the plate thickness direction. Subsequently, the extracted surface pressure distributions are converted into load distributions which are distributions of normal forces (loads) at each location in the belt radial direction on the second side surface FL of the element EL (step S140). The conversion from a surface pressure distribution into a load distribution can be performed by multiplying the plate thickness of a portion of the side surface where the surface pressure is applied by spacings between surface pressures which are extracted at each location in the ring radial direction by analysis (minute spacings in the ring radial direction). When the surface pressure distributions are converted into load distributions, the load distributions are further converted into friction force distributions (step S150). The conversion from a load distribution into a friction force distribution is performed by multiplying the load distribution by a predetermined coefficient of friction (e.g., $\mu=0.09$).

When the load distributions are thus converted into friction force distributions, resistance forces (anti-pitching moments) Mrp by a friction force which are exerted when the elements EL receive a force in a tangential direction of the sheave SH are calculated based on the friction force distributions (step S160). The anti-pitching moment Mrp is, as described above, a resistance force by a friction force which is exerted when the element EL tries to rotate about a pivot which is the location of the center (center of pitching O) of a load received by the second side surface FL of the element EL. In the present embodiment, as shown in FIG. 14, the calculation of the anti-pitching moment Mrp is performed by determining the center of pitching O such that an integrated value obtained based on distances of an outer friction force distribution in the belt radial direction of the second side surface FL with respect to the center of pitching O of the element EL from the center of pitching O and an integrated value obtained based on distances of an inner friction force distribution in the belt radial direction of the second side surface FL with respect to the center of pitching O from the center of pitching O are equal to each other in absolute value, and taking the sum of the two integrated values derived at that time (or one of the integrated value). In this manner, anti-pitching moments Mrp can be calculated in the analysis models for the plurality of elements EL having different flank angles.

Figure 15:
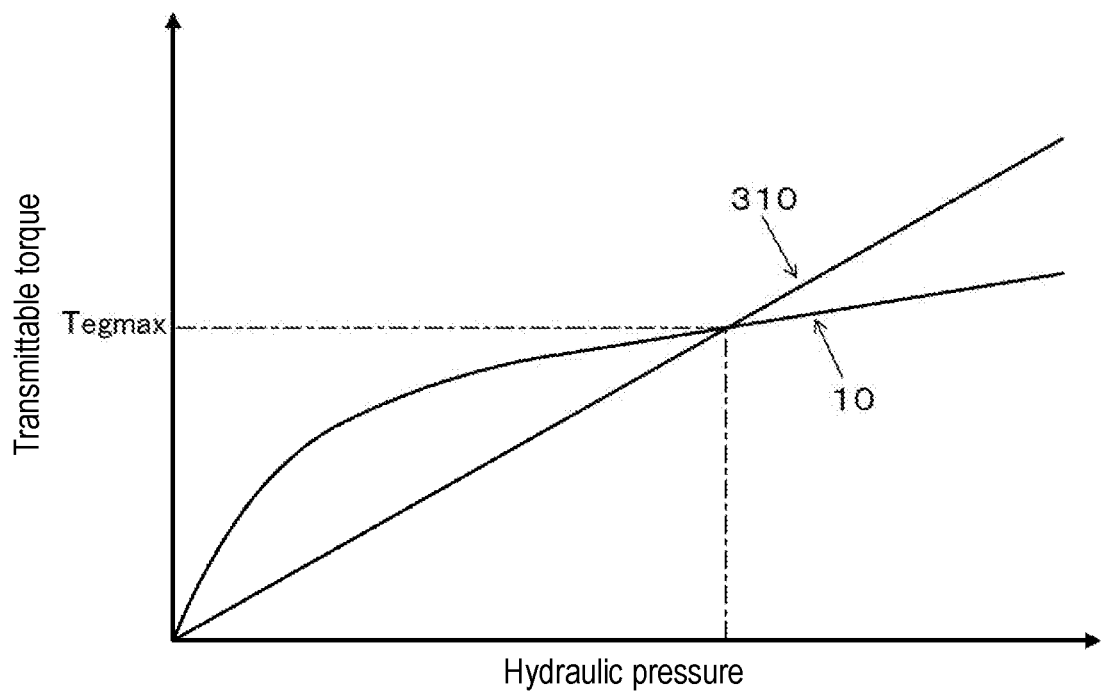
FIG. 15 is an illustrative diagram showing a relationship between transmittable torque and hydraulic pressure for the transmission belt 10 of the present embodiment and a transmission belt 310 of a comparative example.
Figure 16:
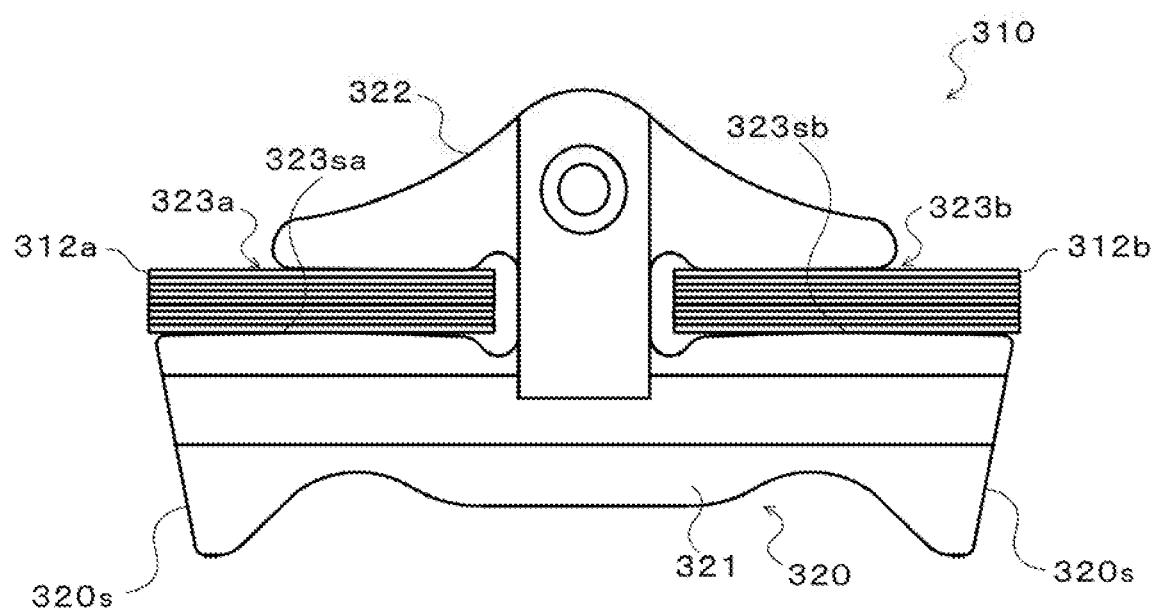
FIG. 16 is a partial cross-sectional view of the transmission belt 310 of the comparative example.

Then, analysis conditions in which only input torque is changed are set (step S170), and stress analysis is performed with the set analysis conditions, by which a minimum principal stress al acting on a portion 51 between the saddle surface SS and an inner surface of a pillar part PL, and a minimum principal stress a2 acting on an edge part S2 (or a slightly inner side than the edge part S2) in a width direction of an edge of a body part BA which is on an opposite side to the saddle surface SS are derived (step S180). Here, in the setting of input torque which is set for stress analysis performed upon deriving minimum principal stresses al and a2, maximum torque that can be inputted to the primary shaft from the engine when lock-up is off (upon stalling) is set. Namely, input torque set at step S120 as an analysis condition for stress analysis for deriving anti-pitching moments Mrp is smaller than input torque set at step S170 as an analysis condition for stress analysis for deriving minimum principal stresses a1 and a2. The minimum principal stresses a1 and a2 mainly occur by a load directed toward the inner side in the belt radial direction and received by the saddle surface SS of the element EL from the ring, and are indices for determining the durability of the element EL. Thus, for the input torque set at step S170, it is desirable to consider torque obtained by multiplying maximum torque that can be inputted to the primary shaft of the continuously variable transmission, i.e., engine's maximum torque, by the torque amplification factor of the torque converter. On the other hand, of the plurality of elements EL having different flank angles, an element EL having a flank angle with the largest anti-pitching moment Mrp becomes substantially parallel, on its second side surface FL, to a contact surface (inclined surface) of the sheave SH, with the element EL being deformed by the set input torque, and a bias in contact pressure (surface pressure) occurring when the second side surface FL receives a force from the sheave SH is reduced (torque transmission efficiency increases), and thus, it is desirable that the input torque set at step S120 be torque in a practical range. For such a reason, input torque set for stress analysis for deriving anti-pitching moments Mrp is set to be smaller than input torque set for stress analysis for deriving minimum principal stresses a1 and a2. FIG. 15 is an illustrative diagram showing a relationship between transmittable torque and hydraulic pressure for the transmission belt 10 of the present embodiment and a transmission belt 310 of a comparative example, and FIG. 16 is a partial cross-sectional view of the transmission belt 310 of the comparative example. Note that the transmission belt 310 of the comparative example includes an element 320 having a substantially trapezoidal body part 321 having a pair of side surfaces 320s at both edges in a width direction, a substantially triangular head part 322 extending from a central portion in the width direction to a ring's outer circumference side, and a pair of depressed parts 323a and 323b that open outward in the width direction between the body part 321 and the head part 322; and a pair of layered rings 312a and 312b which are held in the pair of depressed parts 323a and 323b of the element 320. In the element 320 of the comparative example, inner surfaces in a ring radial direction of the pair of depressed parts 323a and 323b are saddle surfaces 323aa and 323sb. When transmission torque is relatively large, the element 20 of the present embodiment is more likely to be deformed by a load directed toward the inner side in the ring radial direction and received from the layered ring over the element 320 of the comparative example, and the coefficient of a friction force of the pair of second side surfaces 20sb significantly decreases. Due to this, when torque to be transmitted is relatively large, as shown in FIG. 15, hydraulic pressure to be supplied from the hydraulic control device is larger in the element 20 of the present embodiment than the element 320 of the comparative example. Hence, in the present embodiment, in order to prevent a shortage of hydraulic pressure which results from a reduction in the coefficient of a friction force when torque to be transmitted is relatively large, for input torque set at step S120, the largest torque Tegmax among torques in a practical range, i.e., torque obtained when lock-up is on (upon non-stalling), is set. Then, the element 20 is designed such that the coefficient of a friction force is the above-described predetermined coefficient of a friction force (e.g., $\mu=0.09$) at that time.

Figure 17:
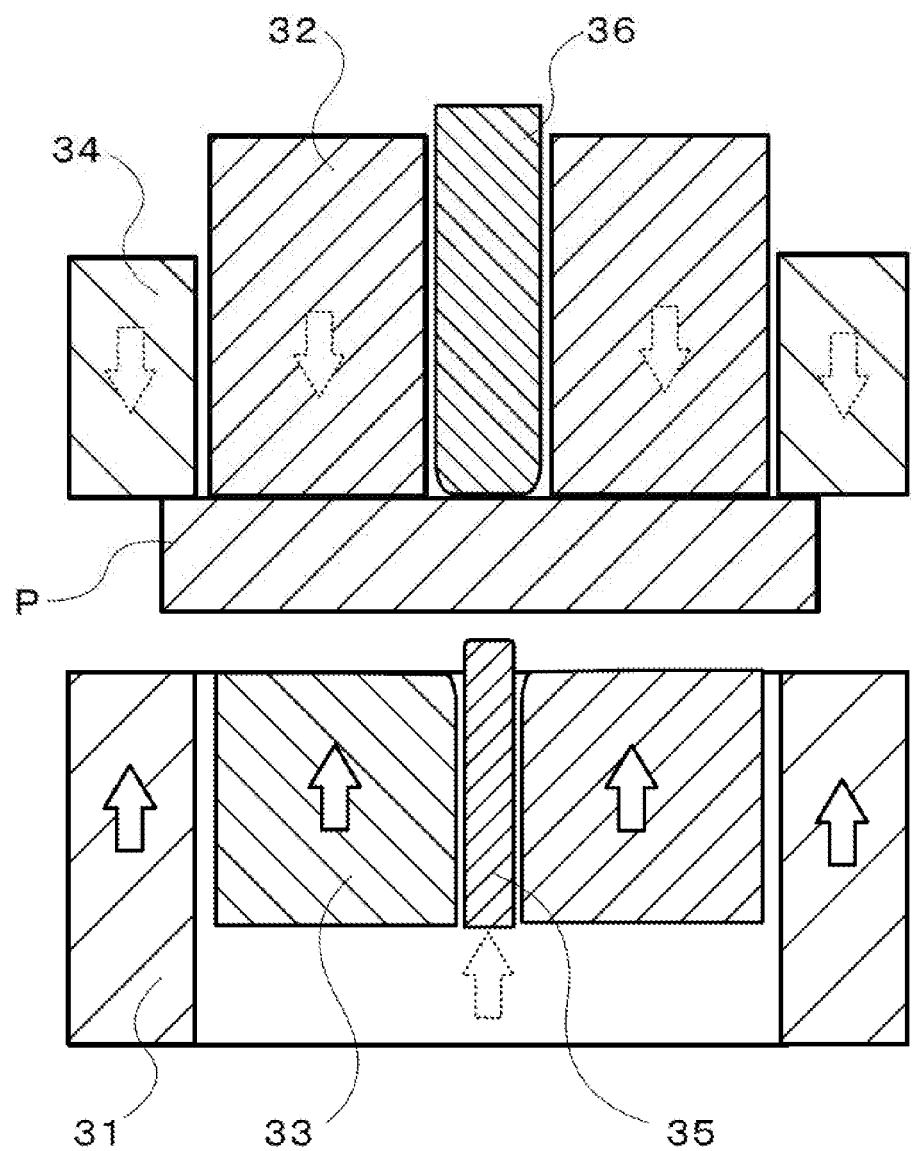
FIG. 17 is an illustrative diagram showing a state of formation of an element 20.
Figure 18:
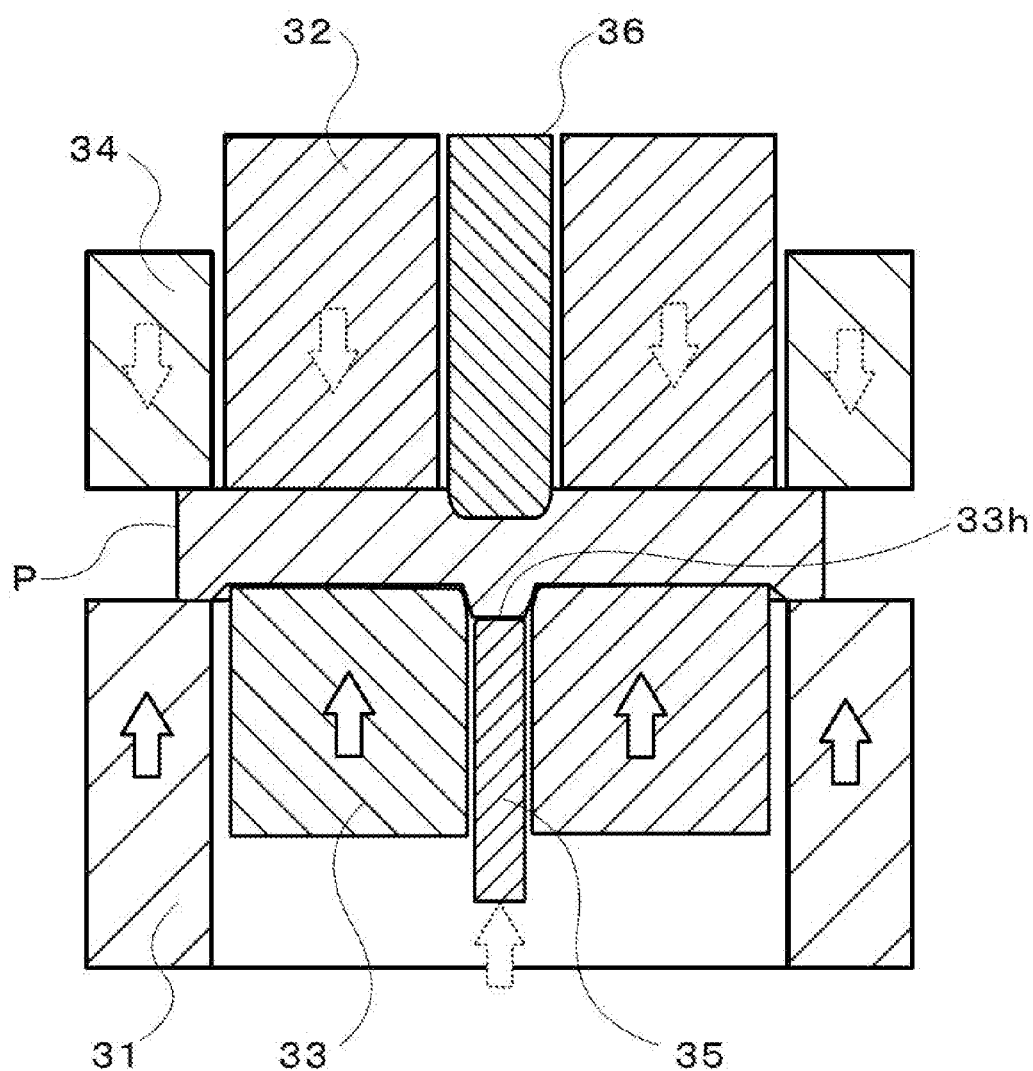
FIG. 18 is an illustrative diagram showing a state of formation of the element 20.
Figure 19:
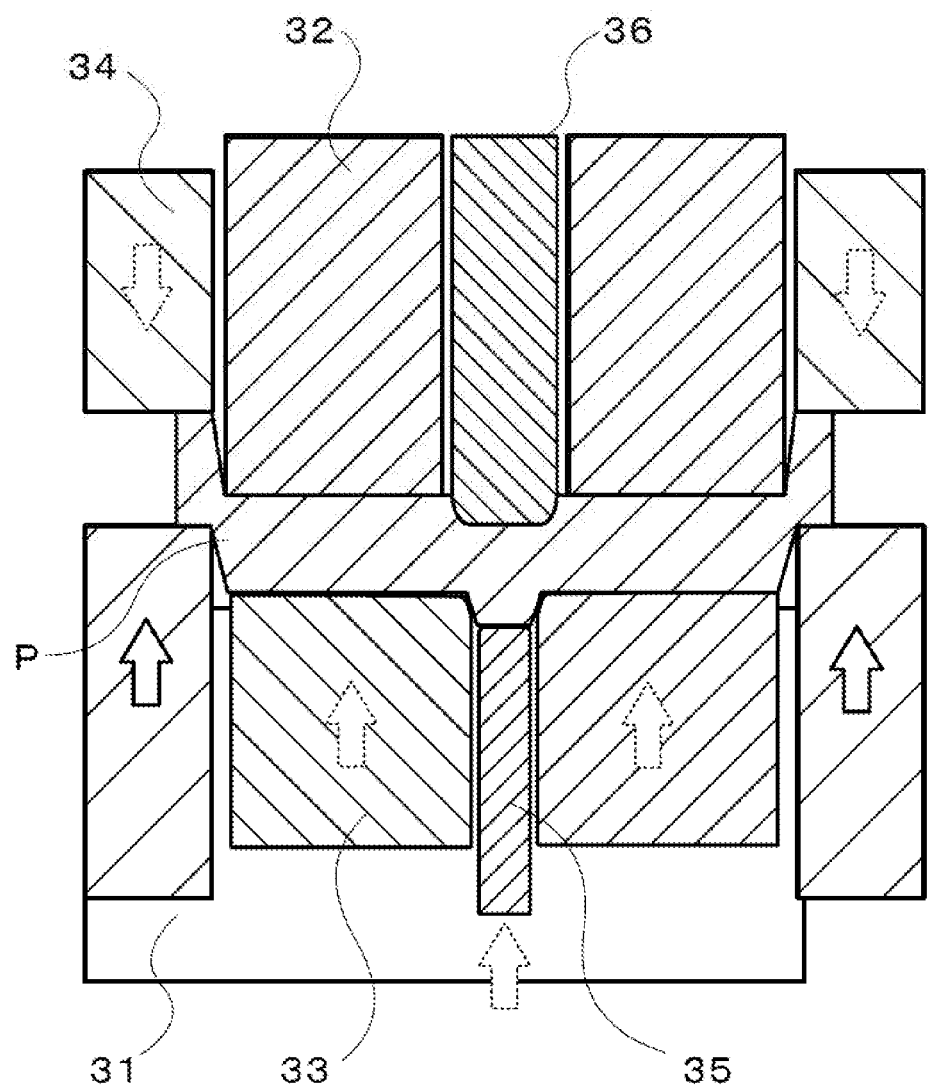
FIG. 19 is an illustrative diagram showing a state of formation of the element 20.

When an anti-pitching moment Mrp and two minimum principal stresses a1 and a2 are thus derived in each of the analysis models for the plurality of elements EL having different flank angles, a flank angle that is set for a model having the largest anti-pitching moment Mrp is determined to be an optimal flank angle bop in a range in which either of the absolute values of the derived two minimum principal stresses (the compression side is negative) a1 and a2 does not exceed an allowable value (step S190). Then, a die (the shapes of a die plate, a punch, an ejector, and a pusher) is designed such that the flank angle is the optimal flank angle bop (step S200), and a steel sheet (flat-shaped member) is stamped using the designed die, by which an element is formed (step S210), and the element is completed. FIGS. 17 to 19 show the states of formation of an element using a die. Note that in the drawings an open arrow with a solid line indicates a state of going up or down in an arrow direction, and an open arrow with a dashed line indicates a state of pressurizing in an arrow direction. First, as shown in FIG. 17, a die plate 31, an ejector 33, and a knock-out pin 35 are lifted until a top surface of a flat-shaped member P hits on bottom surfaces of a punch 32, a punch pin 36, and a pusher 34, with the bottom surfaces of the punch 32, the punch pin 36, and the pusher 34 being in the same plane. Subsequently, as shown in FIG. 17, a top surface of the ejector 33 is pressed against a bottom surface of the flat-shaped member P, and the top surface of the flat-shaped member P is pressurized downward by the punch 32 and the pusher 34. The punch 32 and the pusher 34 go up together with the flat-shaped member P by applied upward pressure from the ejector 33 while pressurizing the top surface of the flat-shaped member P downward, by which the punch pin 36 fixed so as not to be able to go up or down projects in a downward direction relative to the punch 32, and pressurizes the top surface of the flat-shaped member P downward at a tip part of the punch pin 36. By this, a tapered surface is formed on the bottom surface of the flat-shaped member P by the applied pressure from the ejector 33, and a depressed part is formed on the top surface of the flat-shaped member P by the applied pressure from the punch pin 36, along with which a material flows into a hole part 33h for formation of a protrusion, by which a protrusion is formed on the bottom surface of the flat-shaped member P. Then, as shown in FIG. 19, the pusher 34 pressurizes the top surface of the flat-shaped member P downward while the die plate 31 is lifted, by which the flat-shaped member P is held tight, and by further lifting the die plate 31, the flat-shaped member P is stamped out in an outline shape of an element. Since the shapes of the die plate 31, the punch 32, the ejector 33, and the pusher 34 are designed such that the flank angle of an element is an optimal flank angle θop determined at the above-described step 190, deformation of the element upon torque transmission can be excellently suppressed, and the element capable of excellently suppressing local wear of a pair of second side surfaces can be obtained.

In the method for producing an element of the present embodiment, a flank angle set for a model having the largest anti-pitching moment Mrp is determined to be an optimal flank angle θop in a range in which minimum principal stresses σ1 and σ2 do not exceed an allowable value in absolute value. However, depending on the shape or material of the element, without considering minimum principal stresses, a flank angle set for a model having the largest anti-pitching moment may be determined to be an optimal flank angle θop. In addition, when there is another constraint about the flank surfaces of the element, a flank angle set for a model having the largest anti-pitching moment may be determined to be an optimal flank angle θop in a range in which that another constraint is satisfied.

The method for producing an element of the present embodiment is applied to production (design) of an element 20 having a body part 21 including a saddle surface 23s that comes into contact with a layered ring 12; and a pair of pillar parts 22 extending from both sides in a width direction of the saddle surface 23s in the width direction. However, as shown in FIG. 16, the method can also be applied to production (design) of an element including a body part 321; a substantially triangular head part 322; and a pair of depressed parts 323a and 323b that open outward in a width direction between the body part 321 and the head part 322.

As described above, a transmission belt of the present disclosure is a transmission belt (10) that includes a plurality of elements (20) and a ring (12) that circularly puts together the plurality of elements (20), and that is wound around V-shaped grooves of a pair of pulleys (3 and 5) of a continuously variable transmission (1) to transmit power, and the main points are that the elements (20) each include a body part (21) including a saddle surface (23s) that comes into contact with the ring (12); a pair of pillar parts (22) extending from both sides in a width direction of the saddle surface (23s) in the width direction; and a pair of side surfaces (20s), the pair of side surfaces (20s) each include a first side surface (20sa) formed on a corresponding one of the pillar parts (22); and a second side surface (20sb) formed so as to continue from the first side surface (20sa), and located more on an inner circumference side of the ring (12) than the first side surface (20sa), a pair of the first side surfaces (20sa) each are formed so as to be inclined toward an inner side of a corresponding one of the pillar parts (22) with respect to an extending direction, from an inner circumference side to an outer circumference side of the ring (12), of a corresponding one of the second side surfaces (20sb) continuing from the first side surface (20sa), and a pair of the second side surfaces (20sb) is formed such that the second side surfaces (20sb) are spaced farther apart from each other as the second side surfaces (20sb) extend from the inner circumference side to the outer circumference side of the ring (12), and that an angle (θb) formed between the pair of the second side surfaces (20sb) is larger by 0.2 to 0.8 degrees than an opening angle (θO) of the V-shaped grooves of the pulleys (3, 5).

In an element having a pair of pillar parts on both sides in a width direction of a saddle surface with which a ring comes into contact, upon torque transmission, a force (compression force) from a pulley acts on a pair of side surfaces and a force (tension) from the ring acts on a central portion in the width direction of the saddle surface from an outer circumference side to an inner circumference side of the ring. At this time, the element is significantly deformed by the force from the ring acting on the central portion in the width direction of the saddle surface toward the inner circumference side, and a bias occurs in contact pressure (surface pressure) between the pair of side surfaces and the pulley. As a result, the pair of side surfaces swings (pitches) in a front-back direction when receiving a force in a tangential direction from the pulley, causing local wear in each side surface of the element. The inventors of the present application have found by study that by forming an element such that a pair of first side surfaces each are inclined toward an inner side of a pillar part with respect to an extending direction, from an inner circumference side to an outer circumference side of a ring, of a second side surface continuing from the first side surface, a pair of second side surfaces is spaced farther apart from each other as they extend from the inner circumference side to the outer circumference side of the ring, and an angle formed between the pair of second side surfaces is larger by 0.2 to 0.8 degrees than an opening angle of the V-shaped grooves of the pulleys, upon torque transmission, the pair of second side surfaces becomes substantially parallel to contact surfaces (inclined surfaces) of the pulley with the element being deformed, and a bias in contact pressure between the pair of side surfaces and the pulley occurring when the pair of side surfaces (second side surfaces) receives a force in a tangential direction from the pulley is reduced. By this, the resistance force (anti-pitching moment) by friction between the element and the pulley can be increased, and pitching of the element is excellently suppressed, enabling to reduce local wear of the pair of side surfaces that come into contact with the V-shaped groove of the pulley.

In such a transmission belt of the present disclosure, an angle formed between a pair of the second side surfaces (20sb) may be larger by 0.2 to 0.6 degrees than the opening angle (θO) of the V-shaped grooves of the pulleys (3, 5). By doing so, the anti-pitching moment can be further increased, enabling to further reduce local wear of each side surface caused by pitching of the element.

In addition, in the transmission belt of the present disclosure, the elements (20) each may include locking edge parts (25) that allow an adjacent element (20) to come into contact with the element (20) so that the locking edge parts (25) serve as a pivot of rotation of the two elements (20), and a boundary (B) between the first side surface (20sa) and the second side surface (20sb) may be located more on the outer circumference side than the locking edge parts (25). By this, a contact area of the element with the pulley is increased, by which the anti-pitching moment can be further increased, enabling to further reduce local wear of the side surfaces caused by pitching of the element. In this case, the locking edge parts (25) each may be formed in convex curved surface shape on one of the front and back of the element (20), the convex curved surface shape allowing the element (20) to come into line contact with an adjacent element (20), an edge part (25i) on the inner circumference side of each of the locking edge parts (25) may be located more on the inner circumference side than the saddle surface (23s, T), an edge part (25o) on the outer circumference side of each of the locking edge parts (25) may be located more on the outer circumference side than the saddle surface (23s, T), and the boundary (B) between the first side surface (20sa) and the second side surface (23sb) may be located more on the outer circumference side than the edge part (25o) on the outer circumference side of the locking edge part (25). By doing so, a distance between the saddle surface in the radial direction of the transmission belt and a line of contact between elements during torque transmission can be further reduced, and thus, a difference in angular velocity between the ring and the element is reduced, by which local wear of the side surfaces caused by pitching of the element can be excellently reduced, and friction loss caused by relative sliding between the ring and the element can be excellently reduced.

Furthermore, in the transmission belt of the present disclosure, an edge part (21ei) on the inner circumference side of the body part (21) may be formed to be in flat shape in a width direction. By doing so, the stiffness of the element can be increased, and thus, deformation of the element is suppressed, enabling to excellently reduce local wear of the side surfaces caused by pitching of the element.

In addition, in the transmission belt of the present disclosure, a pair of hook parts (22f) that protrude in the width direction from free end parts of the pillar parts (22) so as to face each other may be further provided, and a retainer ring (15) may be disposed between the ring (12) and the hook parts (22f) of the plurality of elements (20).

Note that although in the present disclosure a mode of a transmission belt is described, a mode of a continuously variable transmission including any of the above-described transmission belts of the present disclosure can also be employed. In this case, an angle (θb) formed between a pair of the second side surfaces (20sb) may be determined such that a pair of the second side surfaces (20sb) becomes substantially parallel to contact surfaces of the pulleys (3, 5) when torque is transmitted with a compression force being greater than or equal to a predetermined value, the compression force being exerted on the transmission belt (10) by the pulleys (3, 5).

In addition, although in the present disclosure a mode of a transmission belt is described, a mode of a method for designing an element included in a transmission belt can also be employed.

Specifically, a method for designing an element of the present disclosure is a method for designing a plurality of elements (20) of a transmission belt (10) that includes the plurality of elements (20) each including a body part (21), a pair of side surfaces (20s) located at both edges in a width direction of the body part (21), and a saddle surface (23s) located between the pair of side surfaces (20s) in the width direction; and a ring (12) that circularly puts together the plurality of elements (20) by an inner circumferential surface of the ring (12) coming into contact with each of the saddle surfaces (23s) of the plurality of elements (20), and that is wound around V-shaped grooves of a pair of pulleys (3, 5) of a continuously variable transmission (1) to transmit power, and the main points are that a pulleys' specification including an opening angle of the pulleys (3, 5), an elements' specification including flank angles, each being an angle formed between the pair of side surfaces (20s), and an analysis condition including input torque of the continuously variable transmission (1) are set, and by analysis based on the pulleys' specification, the elements' specification, and the analysis condition, distributions of friction forces in a radial direction of the ring (12) exerted between the pair of side surfaces (20s) and the pulleys (3, 5) are derived for a plurality of different flank angles, rotational moments at the center of pitching of the elements (20) are derived for the plurality of flank angles from the friction force distributions derived for the plurality of flank angles, and a flank angle suitable for the continuously variable transmission (1) is determined based on the rotational moments derived for the plurality of flank angles.

In the method for designing an element of the present disclosure, a pulleys' specification including an opening angle of the pulleys, an elements' specification including flank angles, each being an angle formed between a pair of side surfaces, and an analysis condition including input torque of the continuously variable transmission are set, and by analysis based on the pulleys' specification, the elements' specification, and the analysis condition, friction force distributions (distributions of friction forces in a ring radial direction) between the pair of side surfaces and the pulleys are derived for a plurality of different flank angles, rotational moments at the center of pitching of the elements are derived for the plurality of flank angles from the derived friction force distributions, and a flank angle suitable for the continuously variable transmission is determined based on the derived rotational moments. The rotational moment at the center of pitching of the element corresponds to a resistance force by a friction force exerted when the element receives a force from the pulley, and thus, by determining a flank angle based on the rotational moment, pitching of the element can be excellently suppressed, enabling to reduce local wear of the pair of side surfaces that come into contact with the V-shaped groove of the pulley.

In such a method for designing an element of the present disclosure, a flank angle at which the largest rotational moment is obtained may be determined to be a flank angle suitable for the continuously variable transmission in a range in which another constraint is satisfied. In this case, the elements (20) each may include a body part (21) including the saddle surface (23s); and a pair of pillar parts (22) extending from both sides in a width direction of the saddle surface (23s) in the width direction, by analysis based on the pulleys' specification, the elements' specification, and the analysis condition, a minimum principal stress acting between the saddle surface (23s) and an inner surface of each of the pillar parts (22) and a minimum principal stress acting on an edge part in a width direction of an edge (21ei) of the body part (21) may be derived for the plurality of flank angles, the edge (21ei) being on an opposite side to the saddle surface (23s), and a flank angle at which the largest rotational moment is obtained may be determined to be a flank angle suitable for the continuously variable transmission (1) in a range in which either of the derived minimum principal stresses does not exceed an allowable value as the another constraint. By doing so, while the durability of the element is secured, pitching of the element is excellently suppressed, enabling to reduce local wear of the pair of side surfaces.

Furthermore, in this case, as the analysis condition used to derive the minimum principal stresses, the input torque may be set to maximum torque that can be inputted to the continuously variable transmission (1), and as the analysis condition used to derive the rotational moments, the input torque may be set to predetermined torque smaller than the maximum torque. Here, in a configuration in which torque from an engine is inputted to a continuously variable transmission through a torque converter with a lock-up clutch, the "maximum torque" may indicate maximum torque that can be inputted to the continuously variable transmission from the engine in a lock-up clutch off state, i.e., in a state in which torque is amplified by the torque converter, and the "predetermined torque" may be maximum torque that can be inputted to the continuously variable transmission from the engine in a lock-up clutch on state. In this case, while the durability of the element in the worst condition is secured, pitching of the element is excellently suppressed with torque in a practical range, enabling to reduce local wear of the pair of side surfaces.

In addition, in the method for designing an element of the present disclosure, by analysis based on the pulleys' specification, the elements' specification, and the analysis condition, distributions of surface pressure in the radial direction received by the pair of side surfaces (20s) from the pulleys (3, 5) may be derived for the plurality of flank angles, and the surface pressure distributions derived for the plurality of flank angles may be converted into distributions of the friction forces in the radial direction.

Furthermore, in the method for designing an element of the present disclosure, a flank angle suitable for the continuously variable transmission (1) may be determined based on the rotational moments derived when the center of pitching is determined such that an integrated value obtained based on distances of an outer friction force distribution in the radial direction of the pair of side surfaces (20s) with respect to the center of pitching of each of the elements (20) from the center of pitching and an integrated value obtained based on distances of an inner friction force distribution in the radial direction of the pair of side surfaces (20s) with respect to the center of pitching from the center of pitching are equal to each other in absolute value. By doing so, a rotational moment matches a resistance force against pitching of the element, and thus, by determining a flank angle based on the rotational moment, pitching of the element can be more excellently suppressed.

In addition, in the present disclosure, a mode of a method for producing an element can also be employed.

Specifically, a method for producing an element of the present disclosure is a method for producing a plurality of elements (20) of a transmission belt (10) that includes the plurality of elements (20) each including a body part (21), a pair of side surfaces (20s) located at both edges in a width direction of the body part (21), and a saddle surface (23s) located between the pair of side surfaces (20s) in the width direction; and a ring (12) that circularly puts together the plurality of elements (20) by an inner circumferential surface of the ring (12) coming into contact with each of the saddle surfaces (23s) of the plurality of elements (20), and that is wound around V-shaped grooves of a pair of pulleys (3, 5) of a continuously variable transmission (1) to transmit power, and a pulleys' specification including an opening angle of the pulleys (3, 5), an elements' specification including flank angles, each being an angle formed between the pair of side surfaces (20s), and an analysis condition including input torque of the continuously variable transmission (1) are set, and by analysis based on the pulleys' specification, the elements' specification, and the analysis condition, distributions of friction forces in a radial direction of the ring (12) exerted between the pair of side surfaces (20s) and the pulleys (3, 5) are derived for a plurality of different flank angles, rotational moments at the center of pitching of the elements (20) are derived for the plurality of flank angles from the friction force distributions derived for the plurality of flank angles, a flank angle suitable for the continuously variable transmission (1) is determined based on the rotational moments derived for the plurality of flank angles, a die (31 to 34) is formed based on the determined flank angle, and outside shapes of the elements (20) are formed by performing press working using the formed die (31 to 34).

Although the embodiments of the present disclosure have been described above, the present disclosure is not limited whatsoever to such embodiments and can, of course, be implemented in various modes without departing from the spirit and scope of the present disclosure.

INDUSTRIAL APPLICABILITY

The various aspects of the present disclosure can be used in manufacturing industries for transmission belts and continuously variable transmissions, etc.

The invention claimed is:

1. A method for designing a plurality of elements of a transmission belt that includes the plurality of elements each including a body part, a pair of side surfaces located at both edges in a width direction of the body part, and a saddle surface located between the pair of side surfaces in the width direction; and a ring that circularly puts together the plurality of elements by an inner circumferential surface of the ring coming into contact with each of the saddle surfaces of the plurality of elements, and that is wound around V-shaped grooves of a pair of pulleys of a continuously variable transmission to transmit power, the method comprising:

setting a pulleys' specification including an opening angle of the pulleys, an elements' specification including flank angles, each being an angle formed between the pair of side surfaces, and an analysis condition including input torque of the continuously variable transmission, and deriving, for a plurality of different flank angles, distributions of friction forces in a radial direction of the ring exerted between the pair of side surfaces and the pulleys, by analysis based on the pulleys' specification, the elements' specification, and the analysis condition;

deriving, for the plurality of flank angles, rotational moments at a center of pitching of the elements from friction force distributions derived for the plurality of flank angles; and determining a flank angle suitable for the continuously variable transmission, based on the rotational moments derived for the plurality of flank angles.

2. The method for designing a plurality of elements according to claim 1, comprising determining a flank angle at which a largest rotational moment is obtained to be a flank angle suitable for the continuously variable transmission, in a range in which another constraint is satisfied.

3. The method for designing a plurality of elements according to claim 2, wherein the elements each include a body part including the saddle surface; and a pair of pillar parts extending from both sides in a width direction of the saddle surface in the width direction, and the method comprises:

deriving, for the plurality of flank angles, a minimum principal stress acting between the saddle surface and an inner surface of each of the pillar parts and a minimum principal stress acting on an edge part in a width direction of an edge of the body part, by analysis based on the pulleys' specification, the elements' specification, and the analysis condition, the edge being on an opposite side to the saddle surface; and determining a flank angle at which a largest rotational moment is obtained to be a flank angle suitable for the continuously variable transmission, in a range in which either of the derived minimum principal stresses does not exceed an allowable value as the another constraint.

4. The method for designing a plurality of elements according to claim 3, comprising:

setting the input torque to maximum torque that can be inputted to the continuously variable transmission, as the analysis condition used to derive the minimum principal stresses; and setting the input torque to predetermined torque smaller than the maximum torque, as the analysis condition used to derive the rotational moments.

5. The method for designing a plurality of elements according to claim 1, comprising deriving, for the plurality of flank angles, distributions of surface pressure in the radial direction received by the pair of side surfaces from the pulleys, by analysis based on the pulleys' specification, the elements' specification, and the analysis condition, and converting surface pressure distributions derived for the plurality of flank angles into distributions of the friction forces in the radial direction.

6. The method for designing a plurality of elements according to claim 1, comprising determining a flank angle suitable for the continuously variable transmission, based on the rotational moments derived when the center of pitching is determined such that an integrated value obtained based on distances of an outer friction force distribution in the radial direction of the pair of side surfaces with respect to the center of pitching of each of the elements from the center of pitching and an integrated value obtained based on distances of an inner friction force distribution in the radial direction of the pair of side surfaces with respect to the center of pitching from the center of pitching are equal to each other in absolute value.

7. A method for producing a plurality of elements of a transmission belt that includes the plurality of elements each including a body part, a pair of side surfaces located at both edges in a width direction of the body part, and a saddle surface located between the pair of side surfaces in the width direction; and a ring that circularly puts together the plurality of elements by an inner circumferential surface of the ring coming into contact with each of the saddle surfaces of the plurality of elements, and that is wound around V-shaped grooves of a pair of pulleys of a continuously variable transmission to transmit power, the method comprising:

setting a pulleys' specification including an opening angle of the pulleys, an elements' specification including flank angles, each being an angle formed between the pair of side surfaces, and an analysis condition including input torque of the continuously variable transmission, and deriving, for a plurality of different flank angles, distributions of friction forces in a radial direction of the ring exerted between the pair of side surfaces and the pulleys, by analysis based on the pulleys' specification, the elements' specification, and the analysis condition;

deriving, for the plurality of flank angles, rotational moments at a center of pitching of the elements from friction force distributions derived for the plurality of flank angles;

determining a flank angle suitable for the continuously variable transmission, based on the rotational moments derived for the plurality of flank angles;

forming a die based on the determined flank angle; and forming outside shapes of the elements by performing press working using the formed die.

* * * * *